(12) United States Patent
Nelissen et al.

(10) Patent No.: US 10,149,567 B2
(45) Date of Patent: Dec. 11, 2018

(54) APPARATUS FOR COOKING AT LEAST ONE EGG WITH AN EGGSHELL AS WELL AS SUCH A METHOD

(71) Applicant: EGGCITING PRODUCTS B.V., Oirlo (NL)

(72) Inventors: Joseph Wilhelmus Petrus Maria Nelissen, Oirlo (NL); Edwin Matheus Jozef Hanssen, Lanaken (BE); Sander-Willem Van Schaik, Utrecht (NL)

(73) Assignee: EGGCITING PRODUCTS B.V., Oirlo (NL)

( * ) Notice: Subject to any disclaimer, the term of this patent is extended or adjusted under 35 U.S.C. 154(b) by 104 days.

(21) Appl. No.: 15/306,081

(22) PCT Filed: Apr. 14, 2015

(86) PCT No.: PCT/EP2015/058051
§ 371 (c)(1),
(2) Date: Oct. 21, 2016

(87) PCT Pub. No.: WO2015/162032
PCT Pub. Date: Oct. 29, 2015

(65) Prior Publication Data
US 2017/0119194 A1  May 4, 2017

(30) Foreign Application Priority Data
Apr. 24, 2014 (NL) .................... 2012688

(51) Int. Cl.
*A47J 29/02* (2006.01)
*A23L 3/01* (2006.01)
(Continued)

(52) U.S. Cl.
CPC ............. *A47J 29/02* (2013.01); *A23B 5/0052* (2013.01); *A23B 5/01* (2013.01); *A23L 3/01* (2013.01);
(Continued)

(58) Field of Classification Search
CPC ......... A23B 5/005–5/0052; A23B 5/01; A23L 5/13; A23L 5/15; A23L 3/01;
(Continued)

(56) References Cited

U.S. PATENT DOCUMENTS 2,184,063 A * 12/1939 Meyer .................... A23B 5/005
426/300
4,481,392 A * 11/1984 Nibbe .................... A47J 29/00
219/729
(Continued)

FOREIGN PATENT DOCUMENTS

DE  197 38 380 A1  3/1999
EP  0988795 A1  3/2000
(Continued)

OTHER PUBLICATIONS

PCT International Preliminary Report on Patentability Chapter I from PCT/EP2015/058051 dated Oct. 25, 2016.
(Continued)

*Primary Examiner* — Drew E Becker
(74) *Attorney, Agent, or Firm* — Ladas & Parry, LLP

(57) ABSTRACT

An apparatus and method for cooking at least one egg with an eggshell The apparatus comprises a housing provided with a device for providing microwave radiation in a confined space in the housing and a holder located in the confined space. The holder is provided with at least one cavity adapted to the shape of the egg with the eggshell. The apparatus further comprises means to insert a liquid into the holder for filling the cavity with the liquid to at least partly surround the eggshell of the egg located in the cavity. The apparatus comprises also means to control the amount of liquid in the holder during a cooking process of the at least one egg, wherein: —a first amount of liquid is inserted into the cavity before providing microwave radiation in the cavity, which first amount of liquid surrounds the eggshell of the egg located in the cavity; —a second amount of liquid is gradually inserted into the cavity.

16 Claims, 23 Drawing Sheets

(51) Int. Cl.
    *A23L 5/10*     (2016.01)
    *A47J 27/18*     (2006.01)
    *A47J 27/10*     (2006.01)
    *A23B 5/01*     (2006.01)
    *A23B 5/005*     (2006.01)
    *H05B 6/80*     (2006.01)
    *A23L 15/00*     (2016.01)

(52) U.S. Cl.
    CPC   *A23L 5/13* (2016.08); *A23L 5/15* (2016.08); *A23L 15/00* (2016.08); *A47J 27/10* (2013.01); *A47J 27/18* (2013.01); *H05B 6/804* (2013.01); *A23V 2002/00* (2013.01)

(58) Field of Classification Search
    CPC   A23L 15/00–15/35; A47J 27/10; A47J 27/18; A47J 29/00–29/06; H05B 6/80–6/804; A23V 2002/00
    USPC   ........ 426/231–233, 523, 241–243, 614, 426/298–301, 506–511; 99/330, 407, 99/451; 219/679, 687–688, 702, 733, 731
    See application file for complete search history.

(56) References Cited

U.S. PATENT DOCUMENTS

| | | | | |
|---|---|---|---|---|
| 6,097,013 | A * | 8/2000 | Hoeck | A23L 15/00 219/620 |
| 6,410,071 | B1 * | 6/2002 | Polster | A23B 5/0052 426/521 |
| 8,973,492 | B1 * | 3/2015 | Geveke | A23B 5/0052 426/241 |
| 9,108,788 | B2 * | 8/2015 | Nelissen | A23L 1/32 |
| 2003/0054076 | A1 * | 3/2003 | Dibbs | A23B 5/0052 426/241 |
| 2005/0106295 | A1 * | 5/2005 | Davidson | A23B 5/005 426/298 |
| 2005/0233057 | A1 * | 10/2005 | McNulty | A23B 5/0052 426/614 |
| 2007/0202224 | A1 * | 8/2007 | Erasmus | A23B 5/005 426/298 |
| 2008/0145491 | A1 * | 6/2008 | Braeken | A23B 5/0052 426/241 |
| 2011/0200730 | A1 * | 8/2011 | Lewis | A23L 3/001 426/519 |
| 2012/0258218 | A1 * | 10/2012 | Koyun | A23B 5/0052 426/298 |
| 2013/0196039 | A1 * | 8/2013 | Nelissen | A23L 1/32 426/233 |
| 2016/0128504 | A1 * | 5/2016 | Rosland | A47J 29/06 99/440 |
| 2017/0042203 | A1 * | 2/2017 | Nelissen | A47J 29/02 |
| 2017/0042360 | A1 * | 2/2017 | Van Schaik | A47J 29/02 |

FOREIGN PATENT DOCUMENTS

| | | |
|---|---|---|
| EP | 0992197 A1 | 4/2000 |
| WO | 2011/108922 A1 | 9/2011 |
| WO | 2012/002814 A1 | 1/2012 |

OTHER PUBLICATIONS

International Search Report for PCT/EP2015/058051 dated Jul. 1, 2015.

Written Opinion of the International Search Authority PCT/EP2015/058051 dated Jul. 1, 2015.

* cited by examiner

US 10,149,567 B2

APPARATUS FOR COOKING AT LEAST ONE EGG WITH AN EGGSHELL AS WELL AS SUCH A METHOD

CROSS-REFERENCE TO RELATED APPLICATIONS

This application is the U.S. national phase of PCT Application PCT/EP2015/058051 filed on Apr. 14, 2015, which claims the priority of the Dutch patent application No. 2012688 filed on Apr. 24, 2014, which are incorporated herein by reference in their entireties.

FIELD OF THE INVENTION

The invention relates to apparatus for cooking at least one egg with an eggshell, which apparatus comprises a housing provided with a device for providing microwave radiation in a confined space in the housing and a holder located in the confined space, which holder being provided with at least one cavity adapted to the shape of the egg with the eggshell, which apparatus further comprises to insert a liquid means into the holder for filling the cavity with the liquid to at least partly surround the eggshell of the egg located in the cavity.

The invention also relates to a method for cooking at least one egg with an eggshell in such an apparatus.

BACKGROUND OF THE INVENTION

By such an apparatus, which is known from WO2012002814A1, liquid is inserted in the cavity to surround the eggshell of the egg, after which the device for providing microwave radiation is turned on, whereby the liquid as well as the egg is being heated. The liquid is in heat exchanging contact with the eggshell, whereby due to the layer of liquid around the eggshell a good cooking process of the egg by means of the microwave radiation is obtained.

The egg can be cooked in less than two minutes. The apparatus of WO2012002814A1 is provided with an outlet being coupled to a drain for removal of the liquid from the holder after use.

During the cooking process all liquid is maintained inside the cavity to maintain a desired layer of liquid around the egg. A disadvantage of the known apparatus is that a build up of the pressure inside the cavity will occur. Due to said pressure build up the holder needs to be relative strong to be able to withstand the relatively high pressure. Furthermore, at such a system with pressure build up, for example components such as seals and hoses are relatively heavy loaded, are relatively critical, and are relatively demanding and thus relatively expensive. The holder will need to be kept closed with a relatively large force. This limits the feasibility of manual or motorized actuated open-close mechanisms for the holder.

SUMMARY OF THE INVENTION

It is an object of the apparatus according to the invention to maintain a desired layer of liquid around the egg, whilst reducing the pressure build up in the cavity.

This object is achieved by the apparatus according to the invention in that the apparatus comprises means to control the amount of liquid in the holder during a cooking process of the at least one egg, wherein:

a first amount of liquid is inserted into the cavity before providing microwave radiation in the cavity, which first amount of liquid at least partly surrounds the eggshell of the egg located in the cavity;

a second amount of liquid is gradually inserted into the cavity during providing microwave radiation to replenish the amount of liquid that has been evaporated and has left the cavity during providing microwave radiation in the cavity and to maintain a desired layer of liquid around the egg located in the cavity.

By the apparatus according to the invention liquid is allowed to escape from the cavity when the pressure in the cavity rises, for example through a relief valve to limit the pressure build up or by having the cavity in open communication with the environment so that no pressure build up will occur. To maintain the desired layer of liquid around the egg, the second amount of liquid is gradually added, to replenish the amount of liquid that has been evaporated and has left the cavity during providing microwave radiation in the cavity.

It has to be noted that US20089145491A1 discloses an apparatus for cooking at least one egg with an eggshell. However, this apparatus comprises a carrier plate with square openings with rounded corners that constitute holders for the vertical positioning of eggs. The carrier plate can be made from a wired structure in order to ensure adequate circulation of steam around the eggs. The square openings with rounded corners in the carrier plate do not form cavities which can be filled with a liquid to at least partly surround the eggshell of the egg located in the cavity so that a desired layer of liquid around the egg located in the cavity can be maintained.

An embodiment of the apparatus according to the invention is characterized in that the second amount of liquid is gradually inserted into the cavity after a first predetermined period of time of providing microwave radiation and during a second predetermined period of time of providing microwave radiation.

The first and second predetermined periods of time can be based on experiments or can theoretically be determined. Furthermore, adding liquid based on predetermined time periods can easily be controlled.

Another embodiment of the apparatus according to the invention is characterized in that first predetermined period of time of providing microwave radiation is shorter for the cooking process of a soft-boiled egg than for a hard-boiled egg.

By adding an additional amount of liquid relatively early in the process of cooking the egg, a soft-boiled egg will be obtained, whilst by adding the additional amount of liquid later in the process of cooking the egg, a hard-boiled egg will be obtained. In this manner a user can simply obtained the desired boiled egg by amending the first predetermined period of time.

Another embodiment of the apparatus according to the invention is characterized in that the second amount of liquid is larger for the cooking process of a soft-boiled egg than for a hard-boiled egg.

By adding a relatively large second amount of liquid, preferably during a longer second predetermined period of time of providing microwave radiation, a soft-boiled egg will be obtained, whilst by adding a smaller second amount of liquid, preferably during a smaller second predetermined period of time of providing microwave radiation, a hard-boiled egg will be obtained. In this manner a user can simply obtained the desired boiled egg by amending the second amount of liquid.

Another embodiment of the apparatus according to the invention is characterized in that the second amount of liquid is added in pulses during the second predetermined period of time of providing microwave radiation.

In this manner the amount and timing of the second amount of liquid into the cavity can easily be controlled.

Another embodiment of the apparatus according to the invention is characterized in that a constant power of the microwave radiation is used during the cooking process of the at least one egg.

By operating the device for proving microwave radiation at a constant power no irregular change in the microwave radiation will occur. Furthermore, such a device is relatively cheap and is readily available on the market, especially when a device operating at 2.45 GHz will be used. Relatively simple devices for proving microwave radiation have the disadvantage that amending the power of the microwave radiation in the cavity during operation means that the device will be switched on and off during several seconds. Furthermore, the on/off cycle is not very accurate and each time the device needs to start up again whereby an irregular change in the microwave radiation in the cavity will occur. Due to the irregular change in the microwave radiation the egg will not be cooked well and uniformly.

Another embodiment of the apparatus according to the invention is characterized in that the sum of the first predetermined period of time of providing microwave radiation and the second predetermined period of time of providing microwave radiation is about the same for the cooking process of a soft-boiled egg and a hard-boiled egg.

In this manner it is predictable and known in advance how long the cooking process of the egg will take. By simply shifting to a shorter first predetermined period of time and a longer second predetermined period of time a soft-boiled egg will be obtained, whilst by shifting to a longer first predetermined period of time and a shorter second predetermined period of time a hard-boiled egg will be obtained.

Another embodiment of the apparatus according to the invention is characterized in that the first amount of liquid is between 30 and 60 milliliter, whilst the second amount of liquid is between 60 and 120 milliliter.

In this manner the amount of liquid inside the cavity is relatively small, which relatively small amount of liquid can easily be heated up by the microwave radiation, whilst the amount can also easily be replenished.

Another embodiment of the apparatus according to the invention is characterized in that at a power of 1000 Watt and 2.45 GHz of the device for providing microwave radiation, the first predetermined period of time is between 15 and 40 seconds, with a total period of time of providing microwave radiation between 90 and 120 seconds.

With such power and frequency an egg can be well boiled in less than 2 minutes.

Another embodiment of the apparatus according to the invention is characterized in that the liquid is an aqueous liquid with a dielectric constant with an imaginary part, $\varepsilon''$, between 20-500 at a temperature between 0° C.-100° C. at a microwave frequency of 2.45 GHz, preferably water with NaCl, more preferably 0.2 M NaCl.

With such an aqueous liquid it is found out that a good cooking process of an egg is obtained whereby both the egg yoke as well as the egg white get the desired properties. The advantages of the aqueous liquid with the described dielectric constant are described in WO2012002814A1. This document is incorporated by reference in this application.

For example salt preferably NaCl can be added to the liquid, for example water, to obtain the desired aqueous liquid. The apparatus can use tab water to which salt preferably NaCl can be added to obtain the desired aqueous liquid. Water is easily available in every household or restaurant and also salt like NaCl can easily be obtained. Furthermore, a combination of water with such an amount of NaCl is not toxic for humans.

Other kinds of liquid and components are also possible.

Another embodiment of the apparatus according to the invention is characterized in that the apparatus comprises a conduit guiding liquid into the cavity, which conduit is at least partly located in the confined space, wherein the second amount of liquid is preheated in the conduit by the microwave radiation before the liquid is inserted into the holder.

By preheating the second amount of liquid it can be realised that the temperature of the liquid in the cavity will not or nearly not drop during the insertion of the second amount of liquid in the cavity. By preheating the second amount of liquid by the microwave radiation no additional means for preheating the second amount of liquid to the desired temperature for entering the cavity is needed.

Another embodiment of the apparatus according to the invention is characterized in that the part of the conduit located in the confined space is between 40 and 80 centimeters long.

Such a length is long enough to heat up the liquid in the conduit from for example 20° C. when entering said part to about the same temperature as the liquid already present in the cavity, when leaving said part.

Another embodiment of the apparatus according to the invention is characterized in that the liquid has an average layer thickness between the holder and the eggshell of the egg between 2 and 8 millimeters.

With such an average layer thickness the amount of liquid needed for cooking the egg is limited while the layer is thick enough to provide a good cooking process of the egg. As the egg is preferably supported in the cavity by spacers inside the holder and is preferably being pressed against said spacers by a spring, there will be some direct contact between the egg and the holder. However, such contact is limited and nearly the whole eggshell is surrounded by the liquid at the beginning of the cooking process.

Another embodiment of the apparatus according to the invention is characterized in that the means to insert a liquid into the holder comprises at least two pumps, wherein a first pump is connected by a first conduit to the liquid inlet, whilst a second pump is connected by a second conduit to the liquid outlet.

By having two pumps, one for pumping liquid into the cavity through the liquid inlet and one for pumping the liquid out of the cavity through the liquid outlet, no valves are needed between the pumps and the cavity since by switching the pumps on or off, transport of liquid through each pump is being controlled.

Another embodiment of the apparatus according to the invention is characterized in that the second holder part comprises an open outlet for at least a gaseous phase of the liquid formed in the cavity during the cooking process.

When heating the egg and the liquid surrounding the eggshell of the egg, the liquid will be turned into a gaseous phase which gas or steam can escape through the open outlet to prevent a pressure build up in the cavity. Since no large pressure build up occurs in the cavity, the forces on the first and second holder part are relatively low so that a relatively light apparatus can be built.

The invention also relates to a method for cooking at least one egg with an eggshell by means of an apparatus as described above.

A BRIEF DESCRIPTION OF THE DRAWINGS

In the drawings like reference numerals refer to like elements.

DESCRIPTION OF PREFERRED EMBODIMENTS

FIG. 1a-7 show different views of a first embodiment of an apparatus 1 according to the invention and specific parts thereof. From the apparatus 1 only relevant components are shown and other components like covers and mounting constructions for mounting elements in the apparatus are left out for reason of clarity.

Figure 1A:
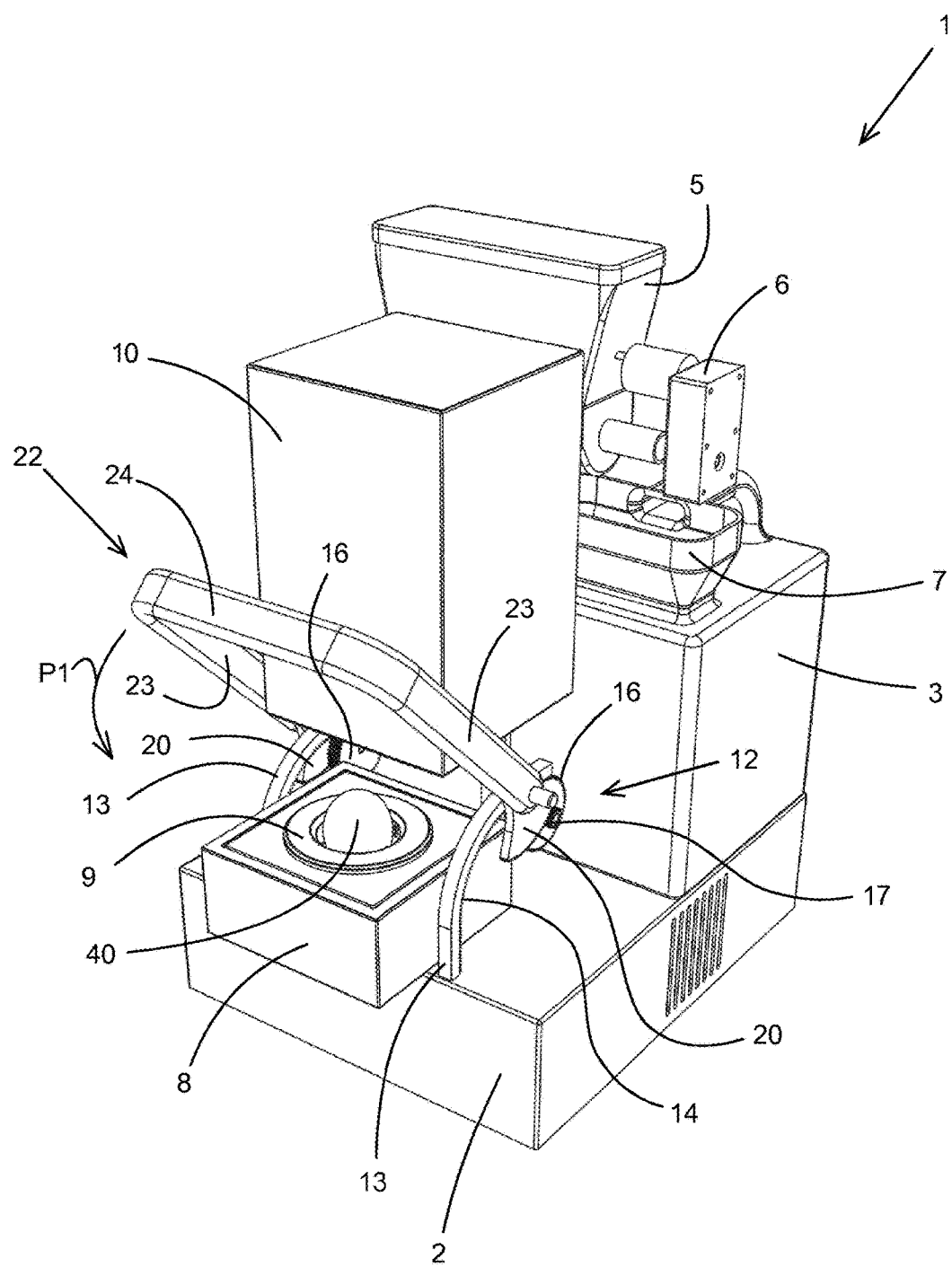
FIGS. 1a and 1b show a perspective front view and rear view of a first embodiment of an apparatus according to the invention in an open position of the housing parts.
Figure 1B:
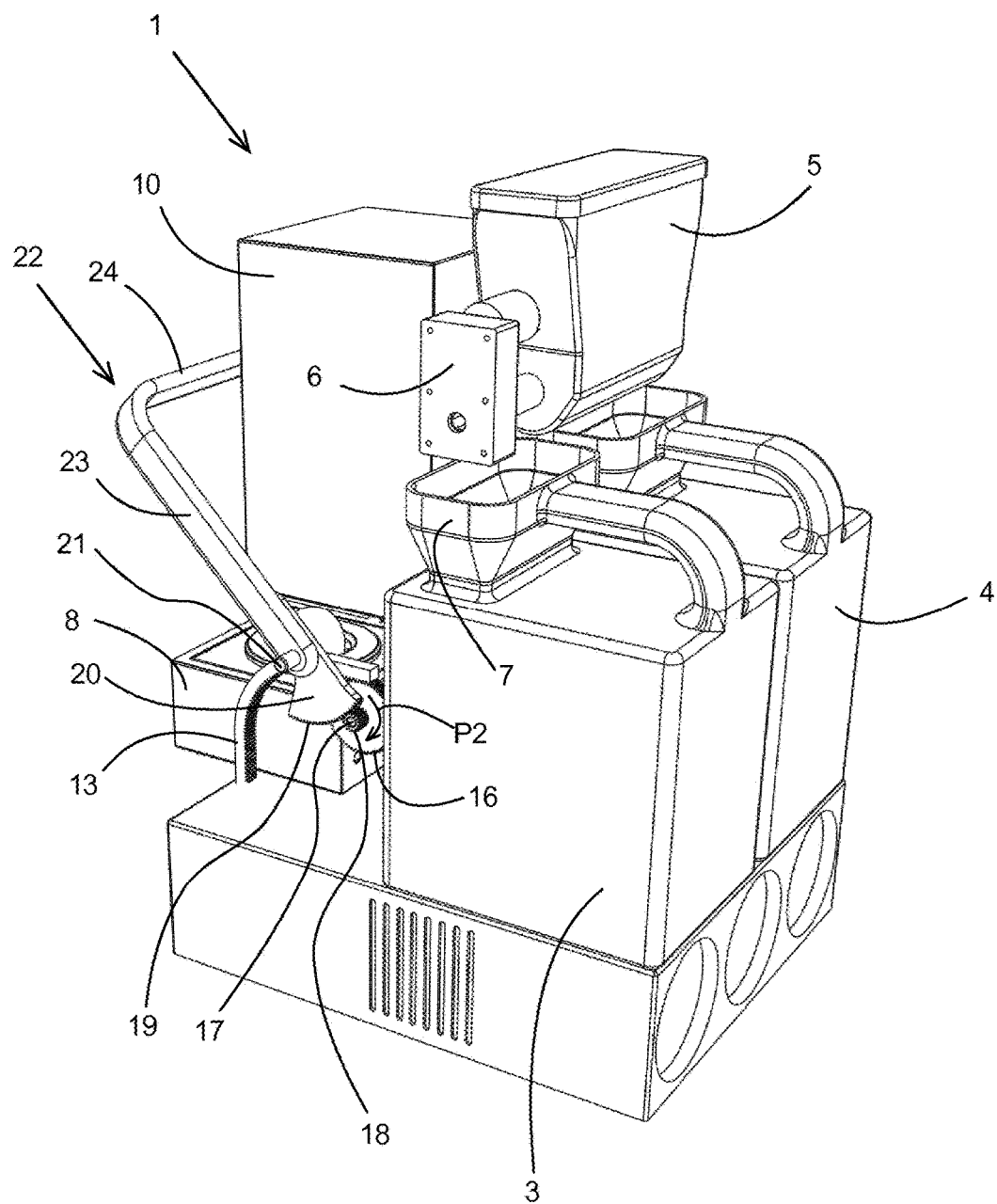
Figure 1C:
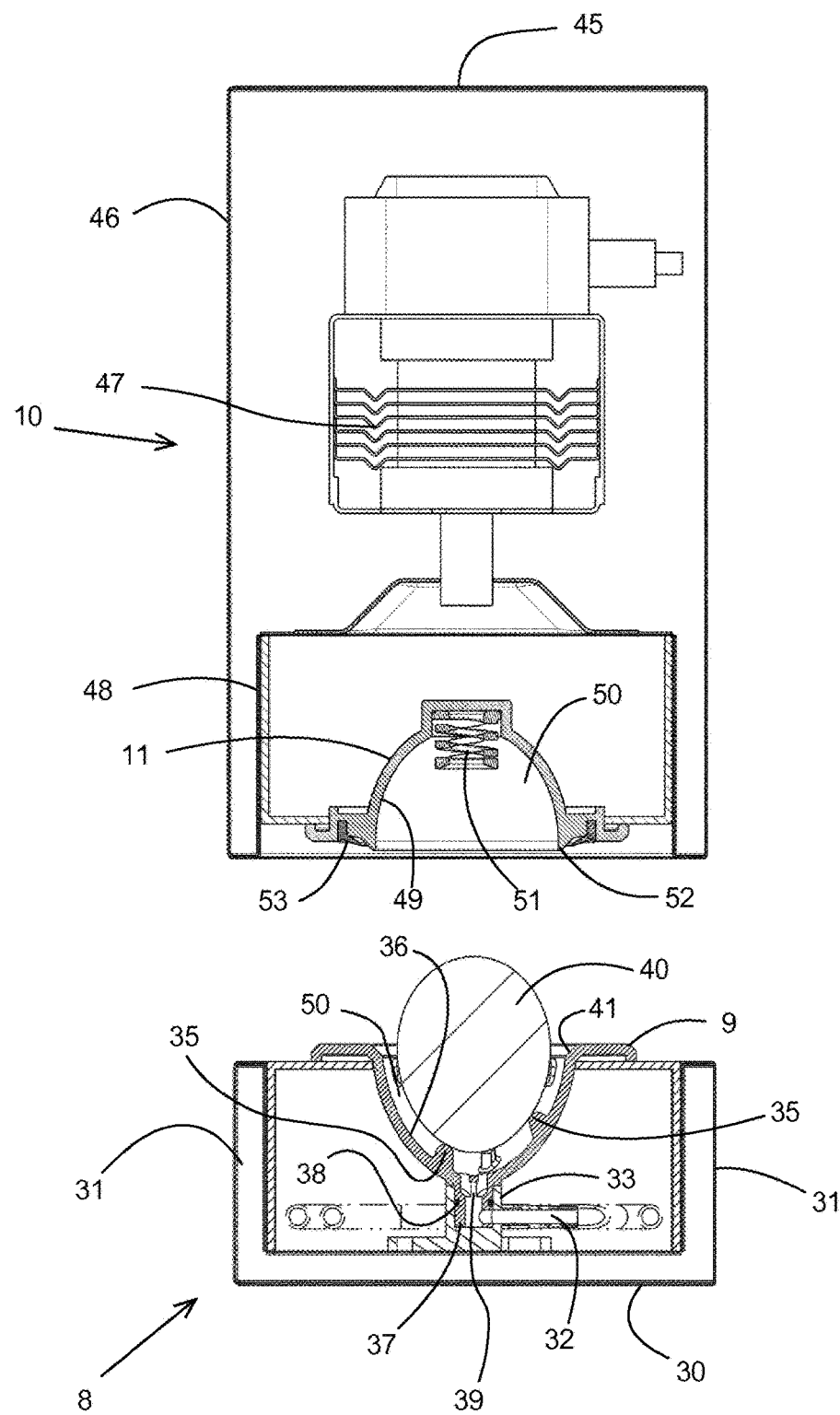
FIG. 1c shows a cross section of a part of the apparatus as shown in FIGS. 1a-1b.
Figure 2:
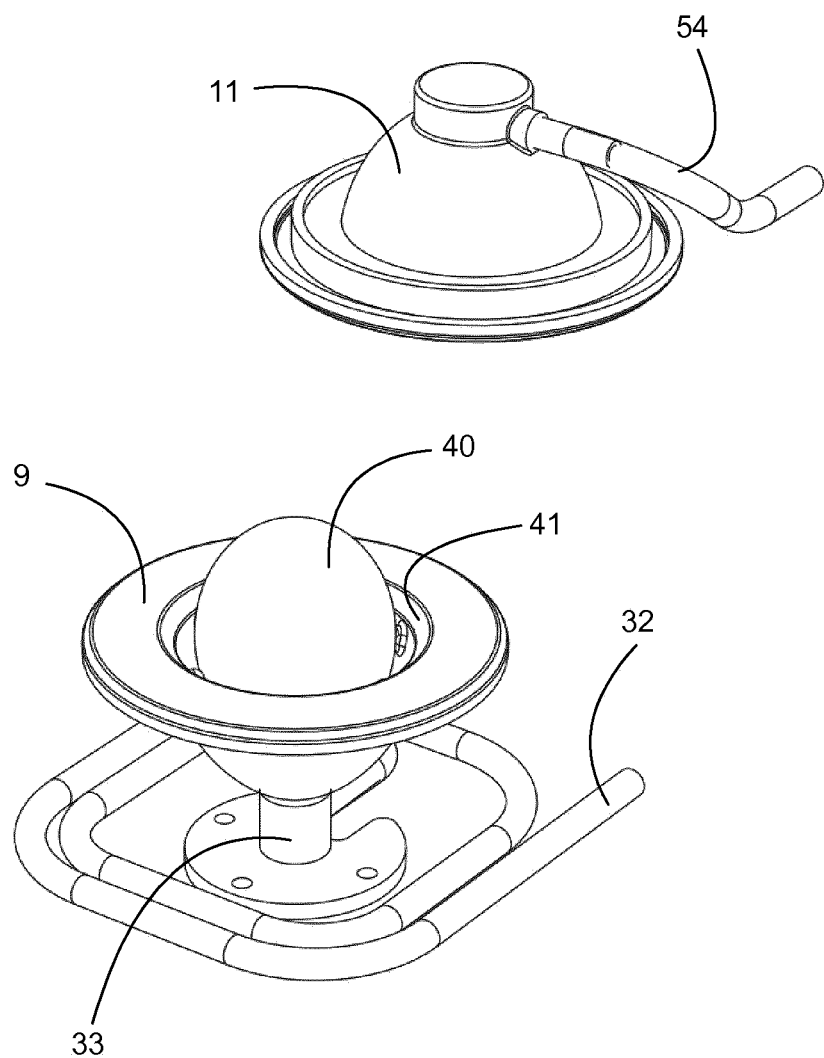
FIGS. 2-4 show perspective views of parts of the apparatus as shown in FIGS. 1a-1c.
Figure 3:
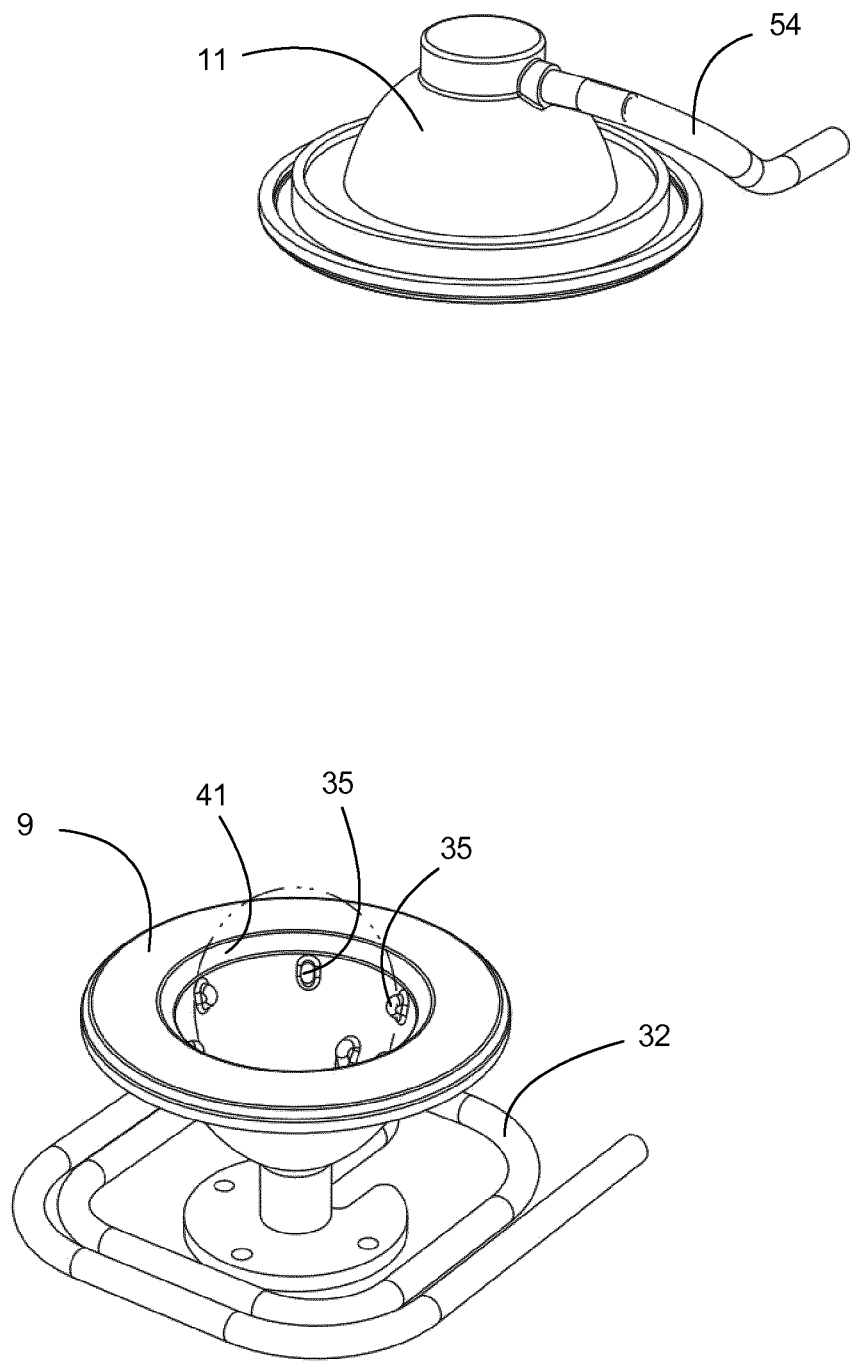
Figure 4:
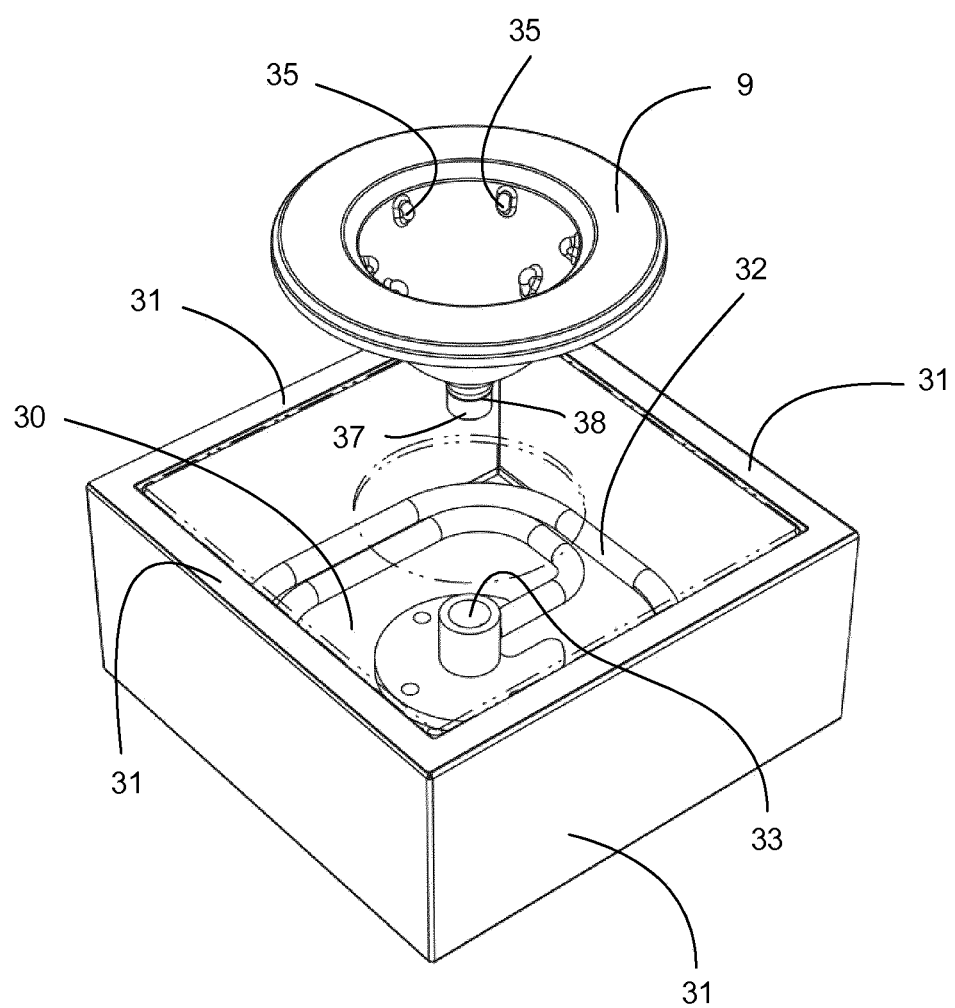
Figure 5:
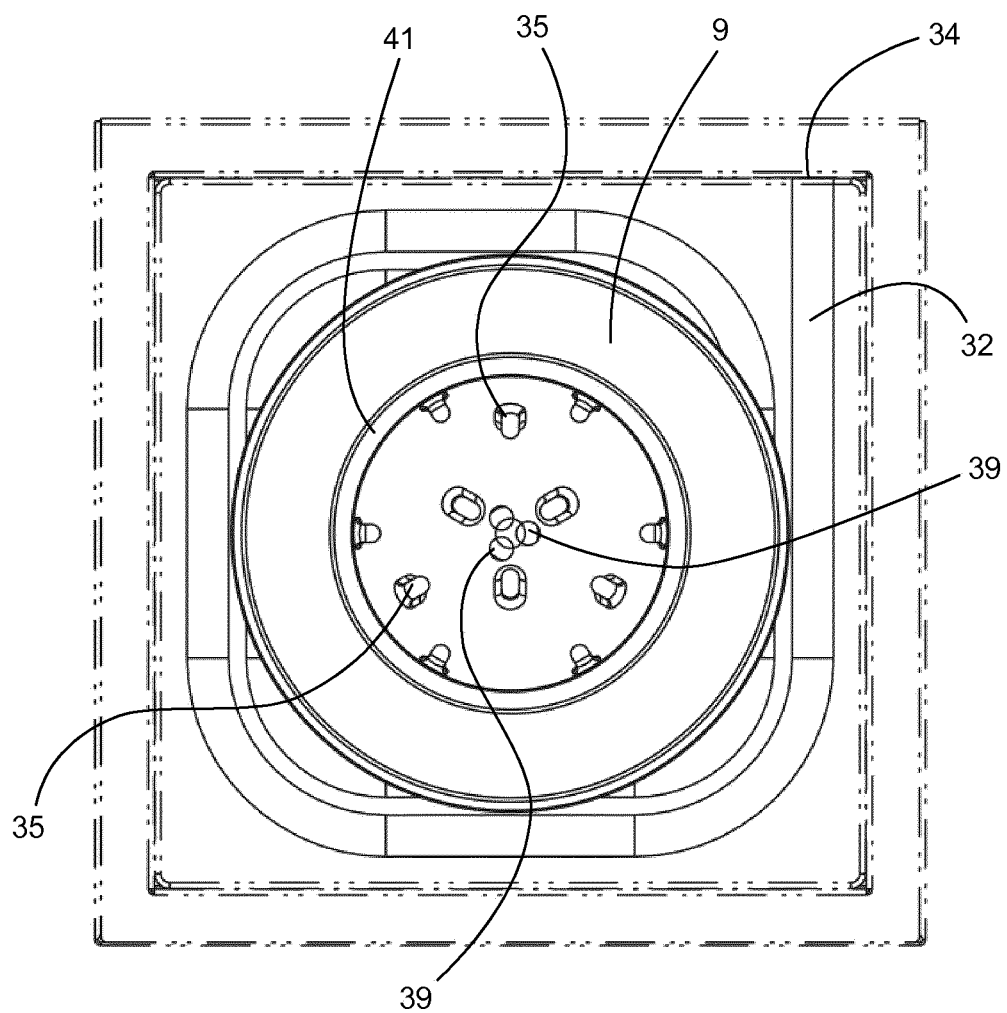
FIG. 5 shows a top view of the part as shown in FIG. 4.
Figure 6A:
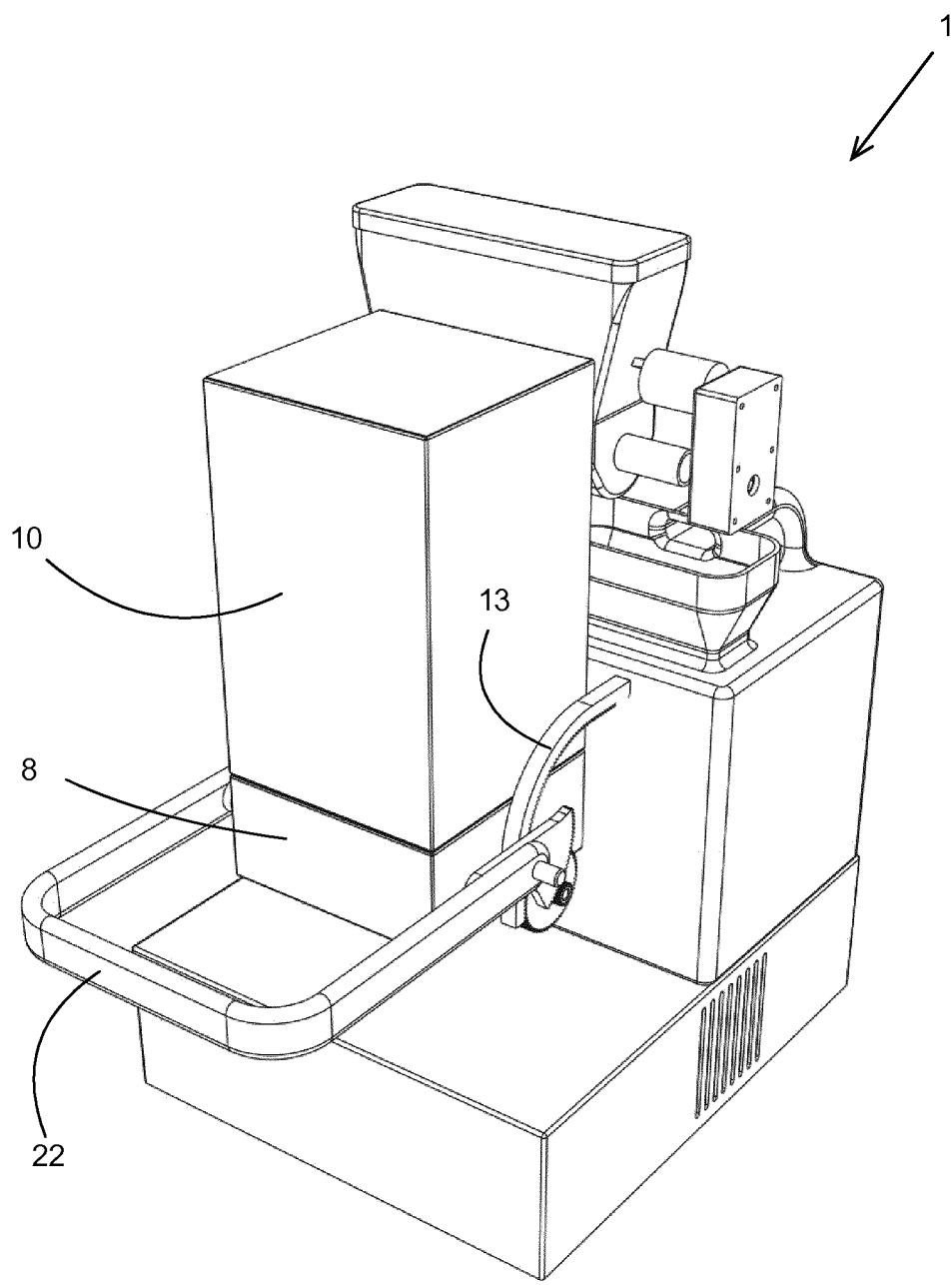
FIGS. 6a and 6b show a perspective front view and rear view of the apparatus as shown in FIG. 1a-1b in a closed position of the housing parts.
Figure 6B:
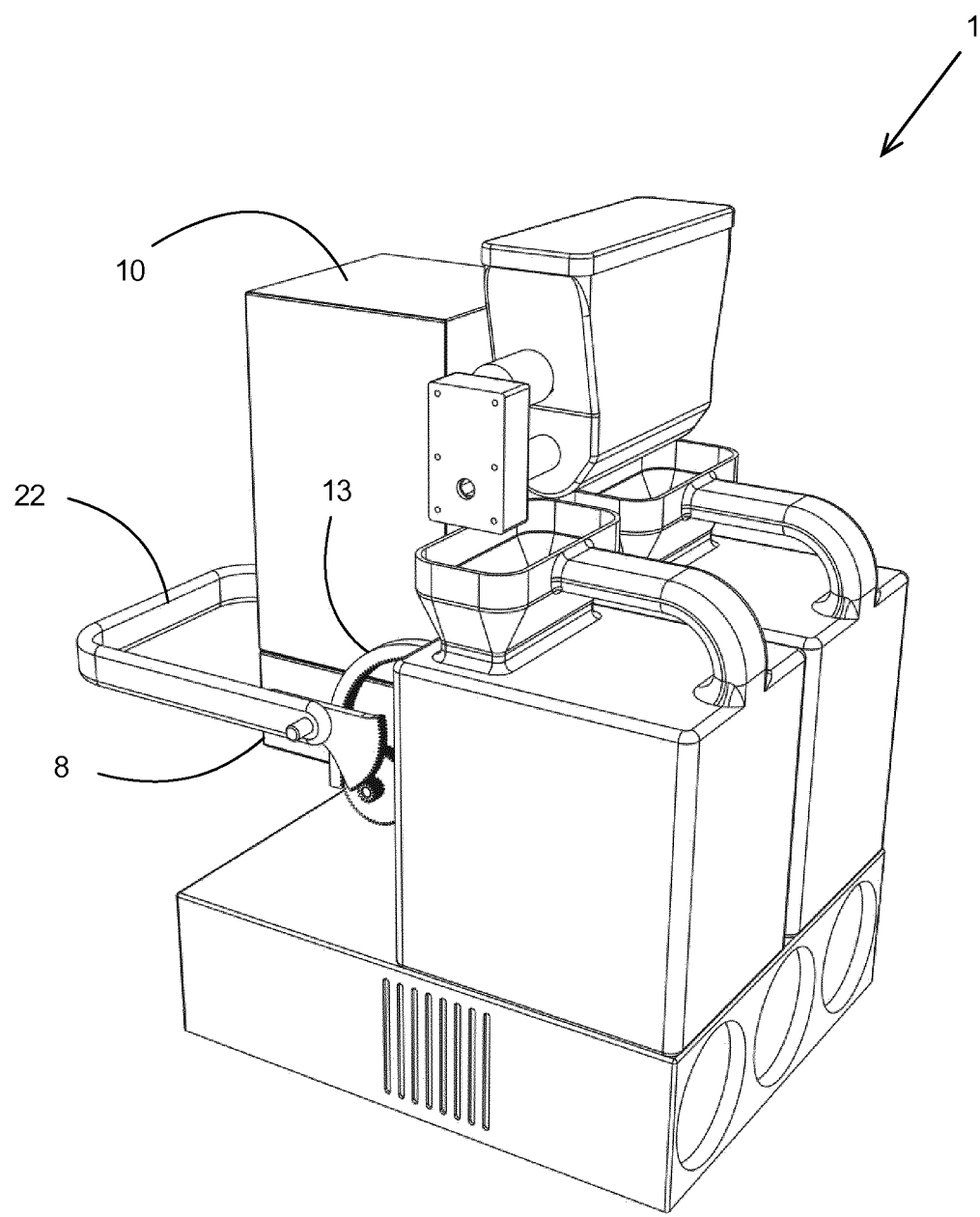
Figure 6C:
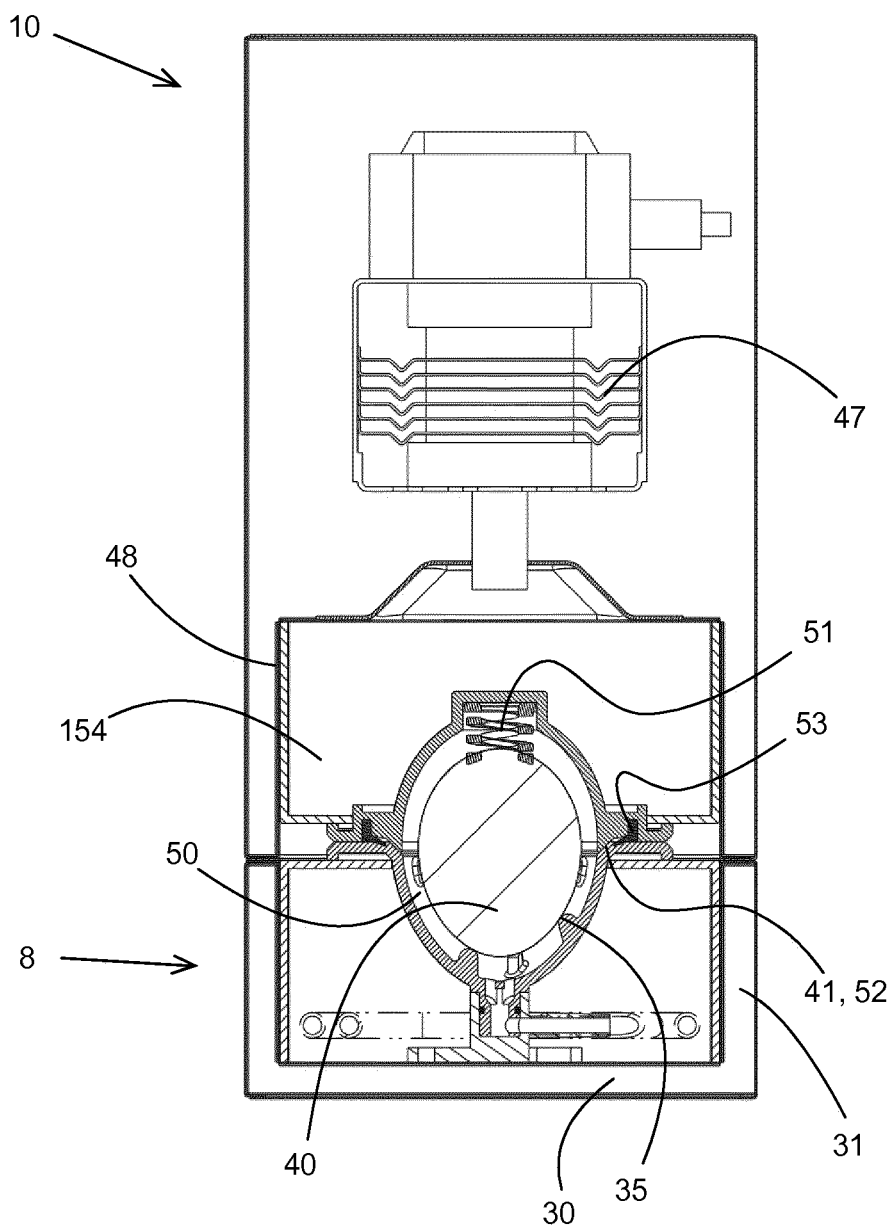
FIG. 6c shows a cross section of the apparatus as shown in FIGS. 6a-6b.
Figure 7:
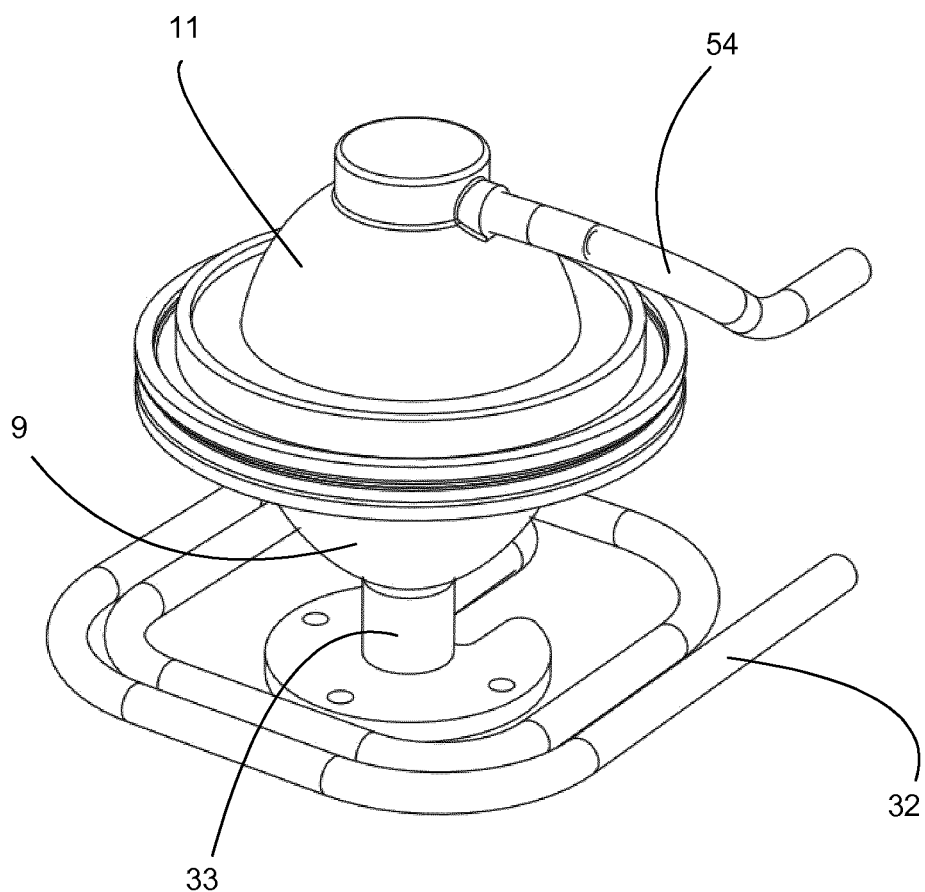
FIG. 7 shows a perspective view of a part of the apparatus as shown in FIGS. 6a-6c.

The apparatus 1 comprises a base 2 on which two containers 3 and 4 are located. Above the containers 3 and 4 a container 5 is located which container is provided with a dosing unit 6. The dosing unit 6 is located above an opening 7 of the container 3. The apparatus 1 further comprises a first housing part 8 with a first holder part 9 as well as a second housing part 10 with a second holder part 11. The second housing part 10 is connected in the apparatus 1 to the base 2 and has a fixed relation thereto. The first housing part 8 is movable with respect to the second housing part 10 between a first open position as shown in FIGS. 1a-1c and a second closed position as shown in FIGS. 6a-6c. The first housing part 8 is movable with respect to the second housing part 10 by means of manually operated gearing mechanisms 12 located on each side of the first and second housing part 8, 10. Each gearing mechanism 12 comprises a curved rod 13 which is provided with teeth 14 on a side directed to the base 2 and the containers 3, 4. The curved rods 13 are connected on two opposite sides of the first housing part 8. Each gearing mechanism 12 further comprises a first gear wheel 16 being pivotably about a pivot axis 17 and a second gear wheel 18 having a smaller diameter than the gear wheel 16, which second gear wheel 18 being connected to the gear wheel 16 and being rotatable simultaneously therewith about the pivot axis 17. The pivot axis 17 has a fixed position in the apparatus 1. The first gear wheel 16 cooperates with the teeth 14 of the rod 13. The second gear wheel 18 cooperates with teeth 19 on a disc 20, which disc 20 is pivotable about a pivot axis 21. The pivot axis 21 has a fixed position in the apparatus 1. The disc 20 is connected on a side remote of the teeth 19 to a U-shaped handle 22. The handle 22 comprises two legs 23 located on both sides of the second housing part 10 and connected to the discs 20, which legs 23 are interconnected on sides remote of the discs 20 by means of a bridge shaped part 24. By pivoting the handle 22 about the pivot axis 21 in a direction as indicated by arrow P1 the teeth 19 on the disc 20 will cooperate with the second gear 18 and will rotate the gear 18 in a clockwise direction as indicated by arrow P2. Since the second gear 18 is connected to the first gear 16, the first gear 16 will also be rotated in clockwise direction. As the teeth of the gear 16 cooperate with the teeth 14 on the rod 13, the rotation of the gear 16 will cause the rod 13 to move along the gear 16, whereby due to the curved shape of the rods 13 the first housing part 8 will firstly be moved in a mainly horizontal direction towards the containers 3, 4, after which the first housing part 8 will be moved simultaneously towards the containers 3, 4 as well as to the second housing part 10, whereby in the final stage of movement of the first housing part 8, the first housing part 8 will be moved vertically towards the second housing part 10 to the second closed position as shown in FIGS. 6a-6c. During the whole movement both housing parts 8, 10 remain horizontal. Especially the horizontal open position of the first housing part 8 being moved forwardly away form the containers 3, 4, facilitates the placement and removal of the eggs and easily prevents the egg from falling out of the first housing part.

As can be seen in FIGS. 1c, 3-5, 6c and 7 the first housing part 8 comprises a square bottom wall 30 and four side walls 31 extending perpendicularly to the bottom wall 30. On the bottom wall 30 a spirally conduit 32 is located which opens near the middle of the bottom wall 30 in a vertically extending tube 33. The end 34 of the conduit 32 is in connection with the container 3, 4 as will be explained with reference to the FIGS. 14 and 16. The first housing part 8 is further provided with the first holder part 9, which holder part 9 has a shape of half an egg and is provided with spacers 35 extending from the wall 36 of the first holder part 9. The first holder part 9 is provided at its lowest part with a tube 37, which fits into the tube 33 in the first housing part 8. The tube 37 is provided with a sealing ring 38 on the outside thereof to provide a watertight sealing between the tubes 33 and 37. The tube 37 is provided on a side near the wall 36 with a grid comprising a number of openings 39. In case that a egg 40 located in the first holder part 9 will break, the grid will prevent parts of the egg shell and the egg to enter the tubes 37, 33 and the conduit 32. As can be seen in FIG. 1c the spacers 35 keep the eggshell of the egg 40 at a predetermined distance from the wall 36 of the first holder part 9.

The wall 36 of the first holder part 9 is provided with a conical part 41 at a side directed towards the second housing part 10.

The second housing part 10 is provided with a square top wall 45 and four side walls 46 extending downwardly therefrom. Inside the walls 45, 46 a device 47 for providing microwave radiation is located. Such an device is well known in the art and will not further be explained.

Below the device 47 a square chamber 48 is located in which the second holder part 11 is mounted. The second holder part 11 is provided with an inner wall 49 having a shape of half an egg. The wall 49 of the second holder part 11 together with the wall 36 of the first holder part 9 define a cavity 50 having an egg shaped form wherein a first longitudinal end being relatively narrow is located near the bottom of the first holder part 9 whilst a second longitudinal end being relatively wide is located near a top of the wall 49. Near the top of the wall 49 a spring 51 is provided, which spring 51 rests against the second end of the egg 40 when the housing parts 8, 10 are in their first closed position (see FIGS. 6, 7), thereby pressing the egg 40 on the spacers 35 to maintain a fixed position of the egg 40 in the cavity 50.

The second holder part 11 is provided with a conical part 52, which cooperates with the conical part 41 of the first holder part 9 to facilitate the correct positioning of the first housing part 8 with respect to the second housing part 10. The second holder part 11 is further provided with a ring shaped seal 53 which rests against the first holder part 9 in the closed position, as shown in FIG. 6c and provides a water tight seal between the first holder part 9 and the second holder part 11. The second holder part 11 is connected near the top thereof to a conduit 54, which conduit 54 is in fluid communication with the container 4, as will be further explained with reference to the FIGS. 14 and 16. In the closed position as show in the FIGS. 6a-6c, microwave radiation can be generated by the device 47 in the confined space 154, which space 154 is bounded by the chamber 48 of the second housing part 10 and the walls 30, 31 of the first housing part 8. The first holder part 9 and the second holder part 11 are made from materials being transparent to microwave radiation so that microwave radiation will also reach the cavity 50 in which an egg 40 is being positioned. Such materials are well known in the art, for example as described in the above mentioned initial patent application WO2012002814A1. Before explaining the operation of the apparatus 1, other embodiments of apparatuses according to the invention will be described since the working principles of these apparatuses are mainly the same.

Figure 8A:
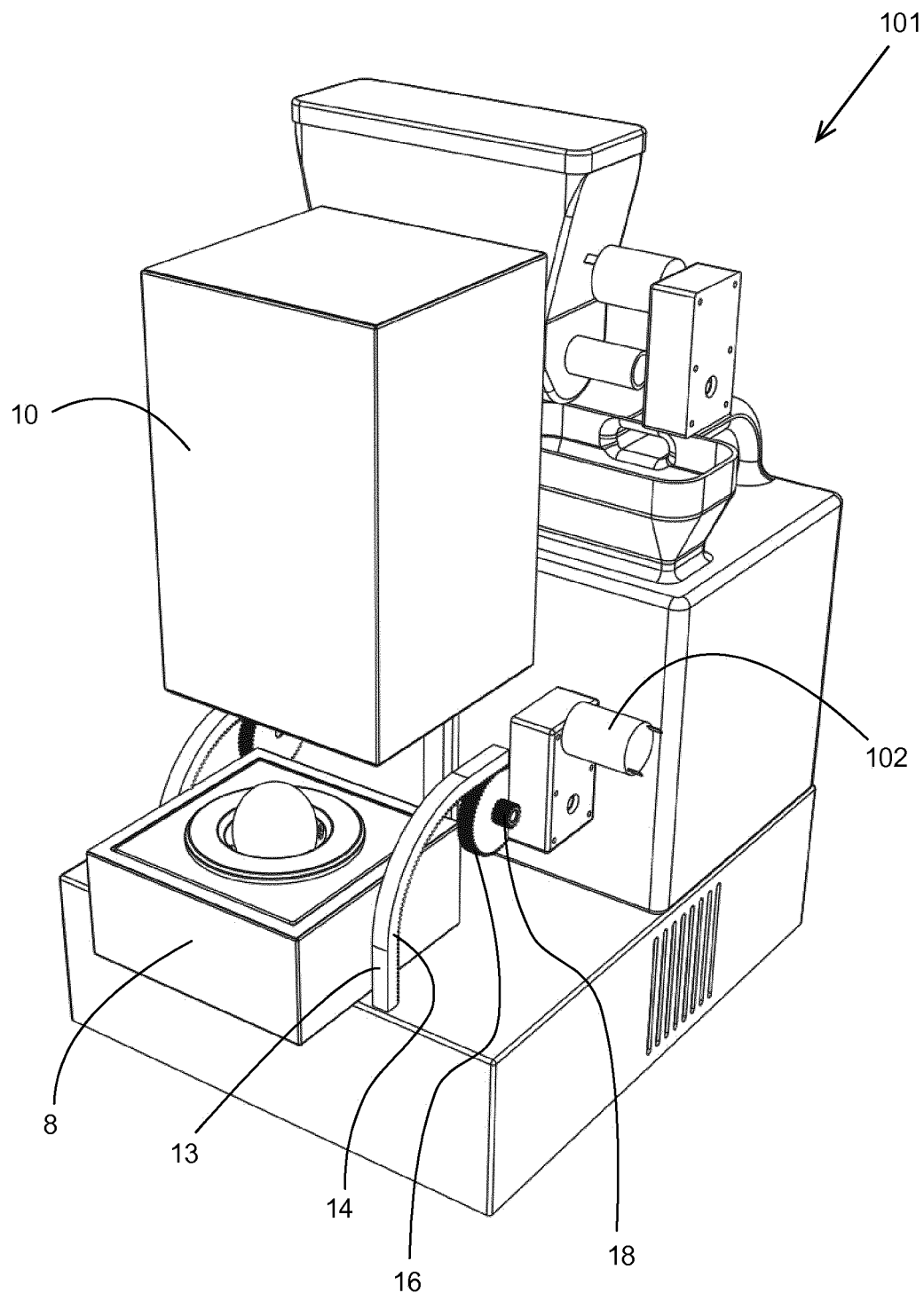
FIGS. 8a and 8b show a front and rear perspective view of a second embodiment of the apparatus according to the invention in an open position of the housing parts.
Figure 8B:
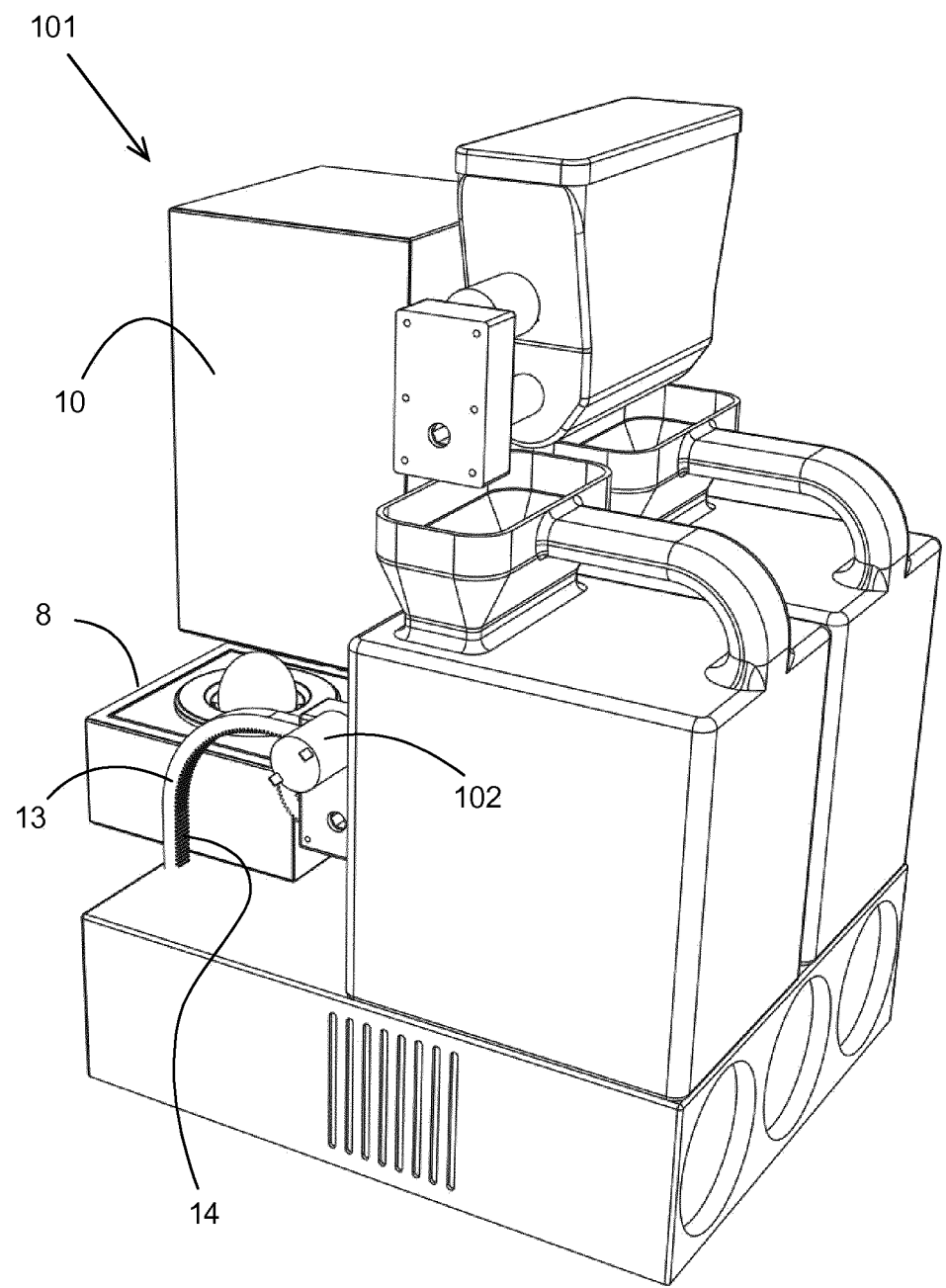
Figure 9:
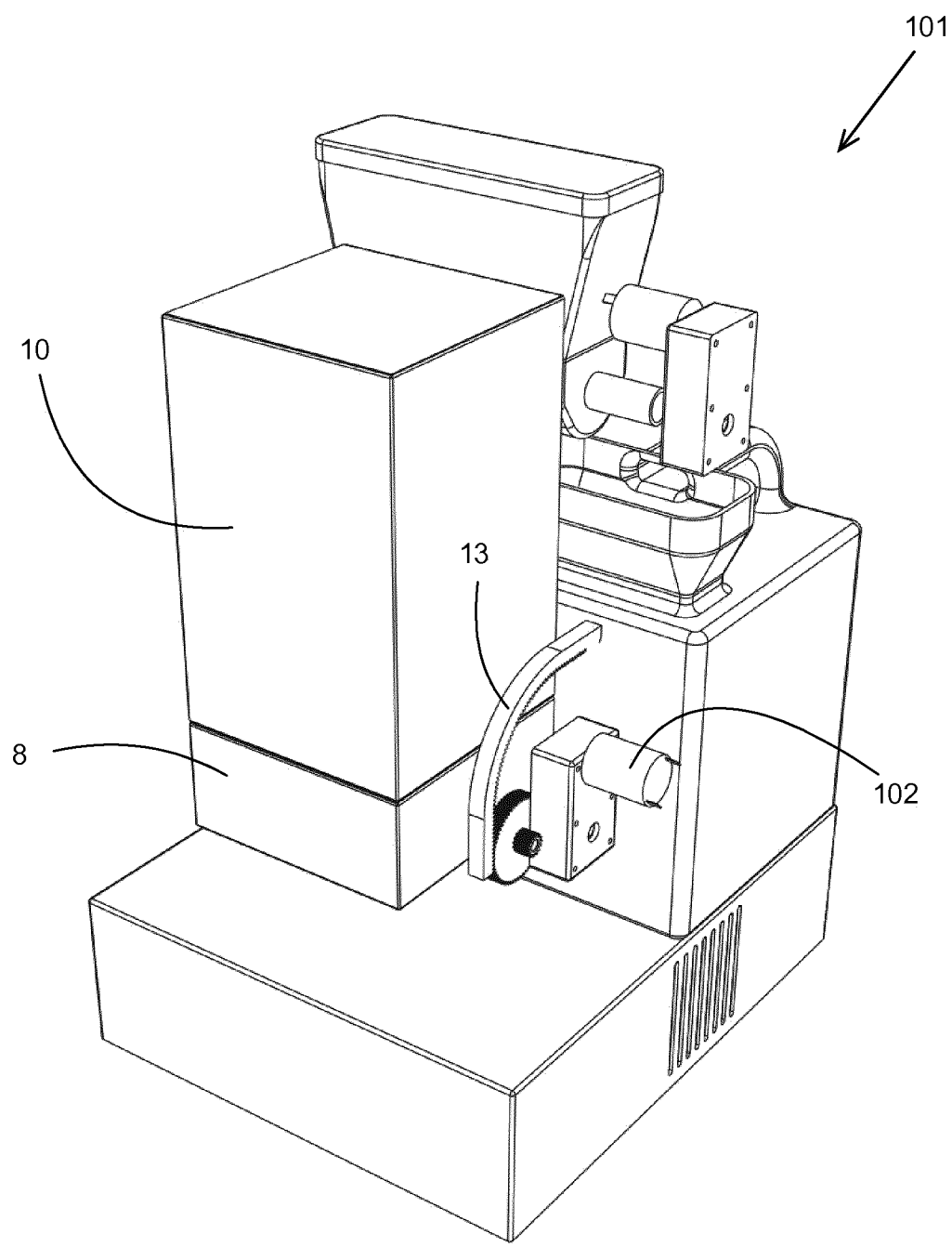
FIG. 9 shows a perspective front view and rear view of the apparatus as shown in FIG. 8a-8b in a closed position of the housing parts.

FIG. 8a-9 disclose a second embodiment of an apparatus 101 according to the invention which apparatus 101 differs from the apparatus 1 in that the gear 18 is driven by an electric motor 102 instead of by pivoting the handle 24 manually.

Figure 10A:
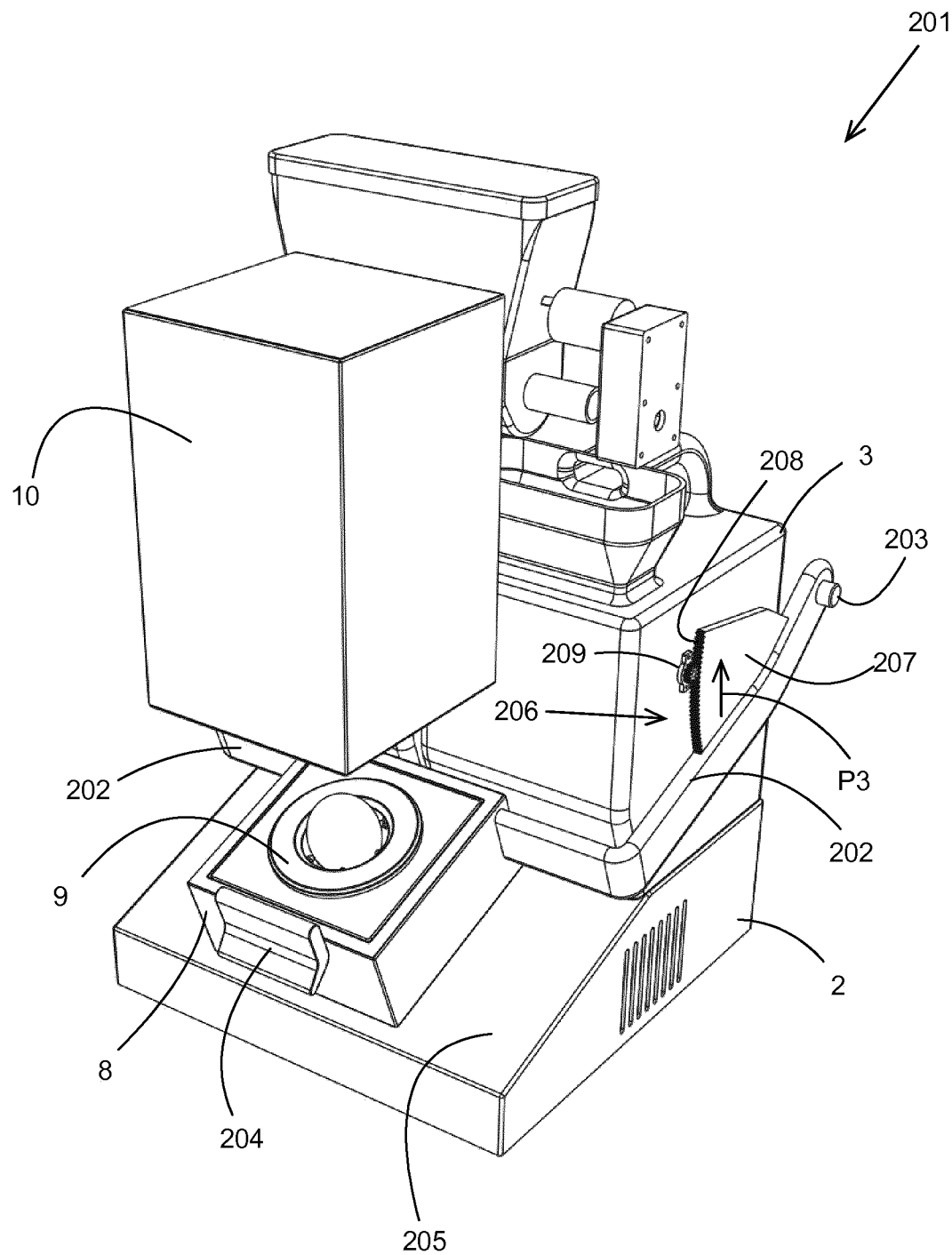
FIGS. 10a and 10b show a front and rear perspective view of a third embodiment of the apparatus according to the invention in an open position of the housing parts.
Figure 10B:
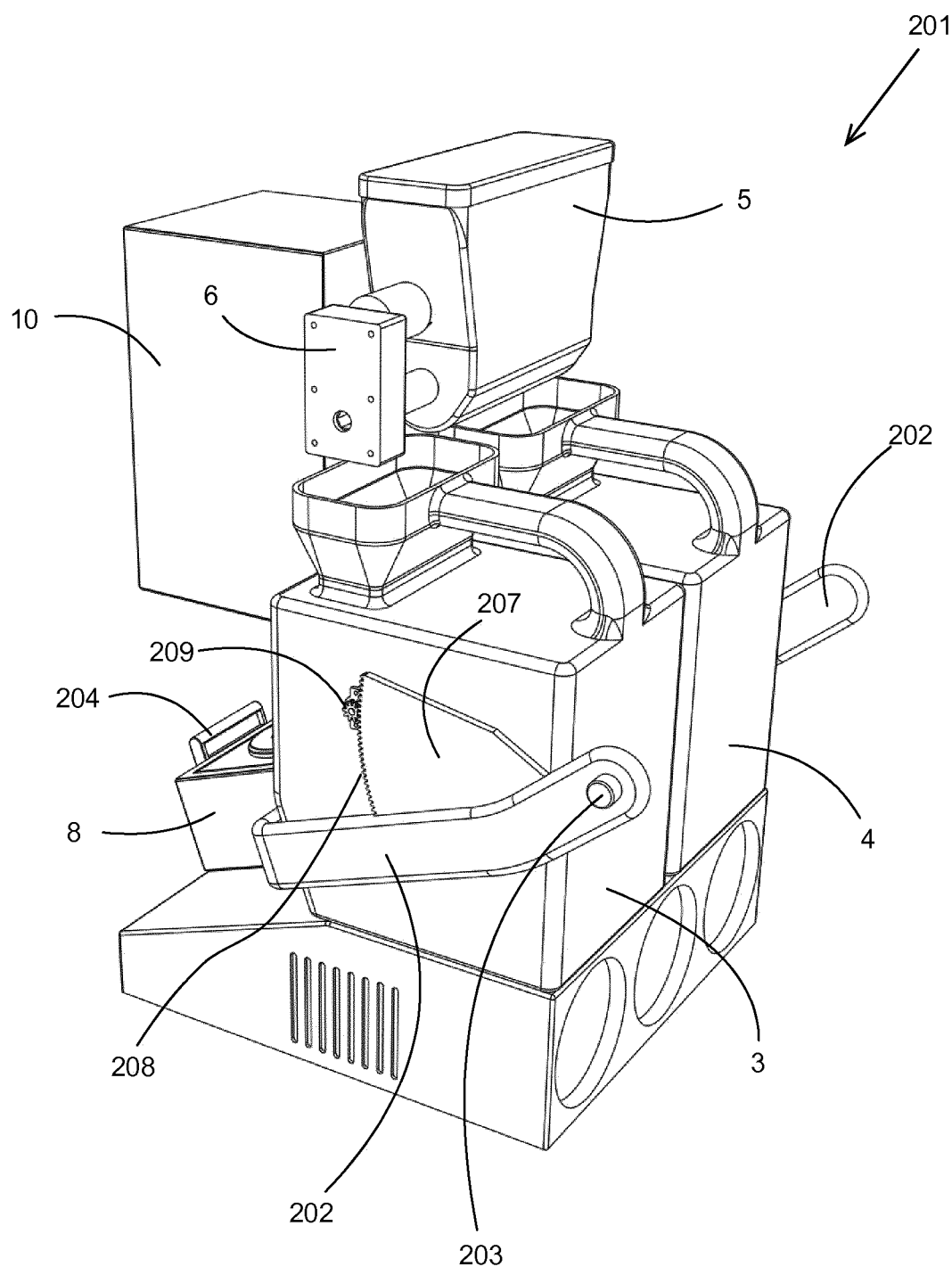
Figure 11:
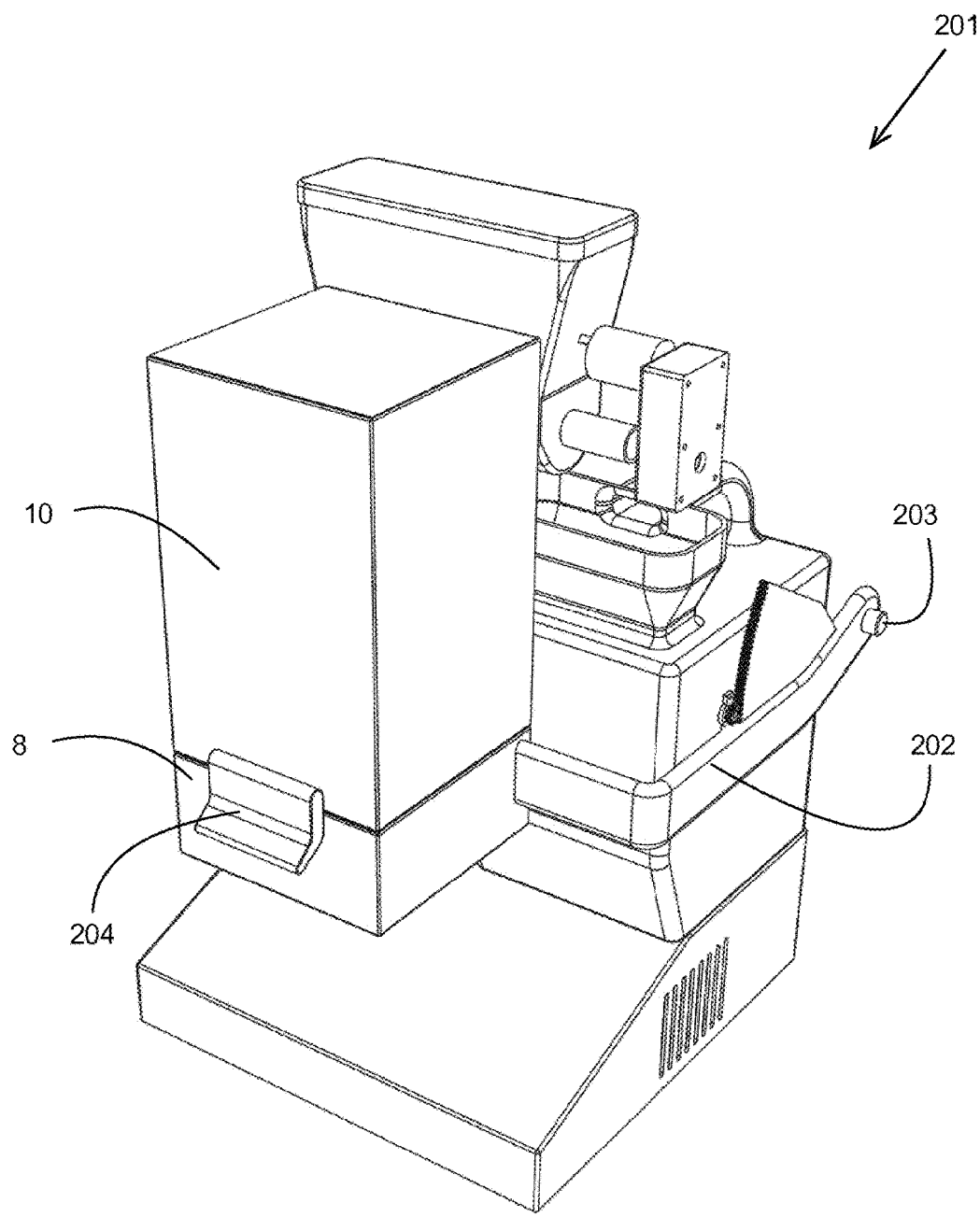
FIG. 11 shows a perspective front view and rear view of the apparatus as shown in figure 10a and 10b in a closed position of the housing parts.

The FIGS. 10a-11 disclose a third embodiment of an apparatus 201 according to the invention which differs from the apparatus 1, 101 in that the first housing part 8 is only pivotable with respect to the second housing part 10. The first housing part 8 is provided at a side near the containers 3, 4 with two L-shaped brackets 202, which L-shaped brackets 202 are pivotable with respect to the base 2 about pivot axis 203. The pivot axis 203 has a fixed position in the apparatus 201. At a side remote of the containers 3, 4 the first housing part 8 is provided with a handle 204. By means by the handle 204 a user can manually move the first housing part 8 from the open position as shown in FIGS. 10a-10b to the closed position as shown in FIG. 11 and vice versa. In the handle 204 a locking mechanism is provided to lock the handle 204 to the second housing part 10 in the closed position of the housing parts 8, 10. Well known locking mechanisms can be used for such a lock. The base 2 of the apparatus 201 is provided with a slanted surface 205 on which the first housing part 8 rests in the open position thereof.

To provide a smooth movement of the first housing part 8 from the closed position to the open position and to prevent that the first housing part 8 simply drops on the slanted surface 205, the apparatus 201 is provided with a damping mechanism 206.

The damping mechanism 206 comprises on each L-shaped bracket 202 a disc 207 being provided with teeth 208. The teeth 208 cooperate with a gear wheel 209, which is rotatable about an axis which has an fixed position in the apparatus 201. The gearwheel 209 is prevented against relatively fast rotation so that only by moving the teeth 208 relatively slowly in or opposite a direction as indicated by arrow P3 the first housing part 8 can be moved with respect to the second housing part 10.

Figure 12A:
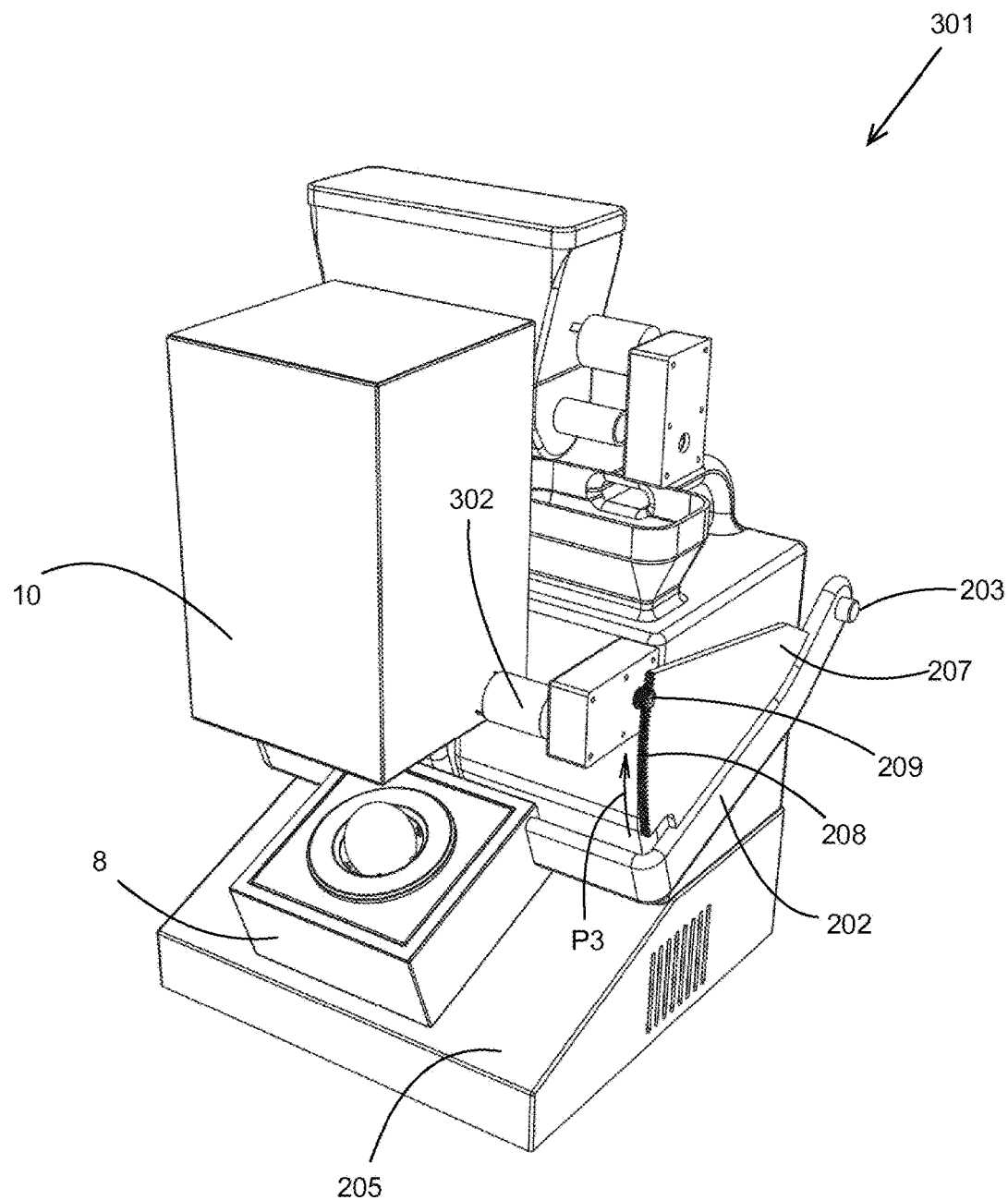
FIGS. 12a and 12b show a front and rear perspective view of a fourth embodiment of the apparatus according to the invention in an open position of the housing part.
Figure 12B:
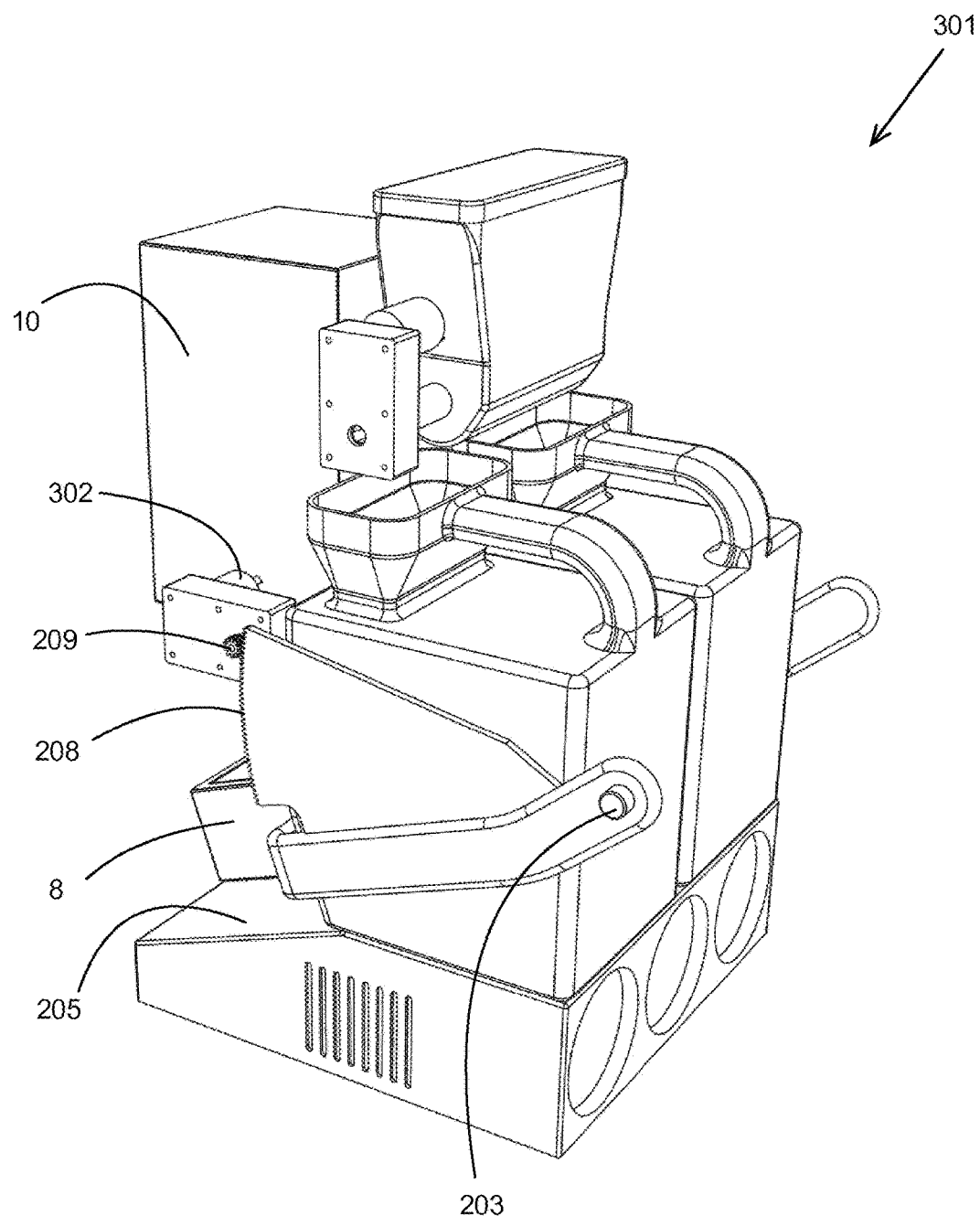
Figure 13:
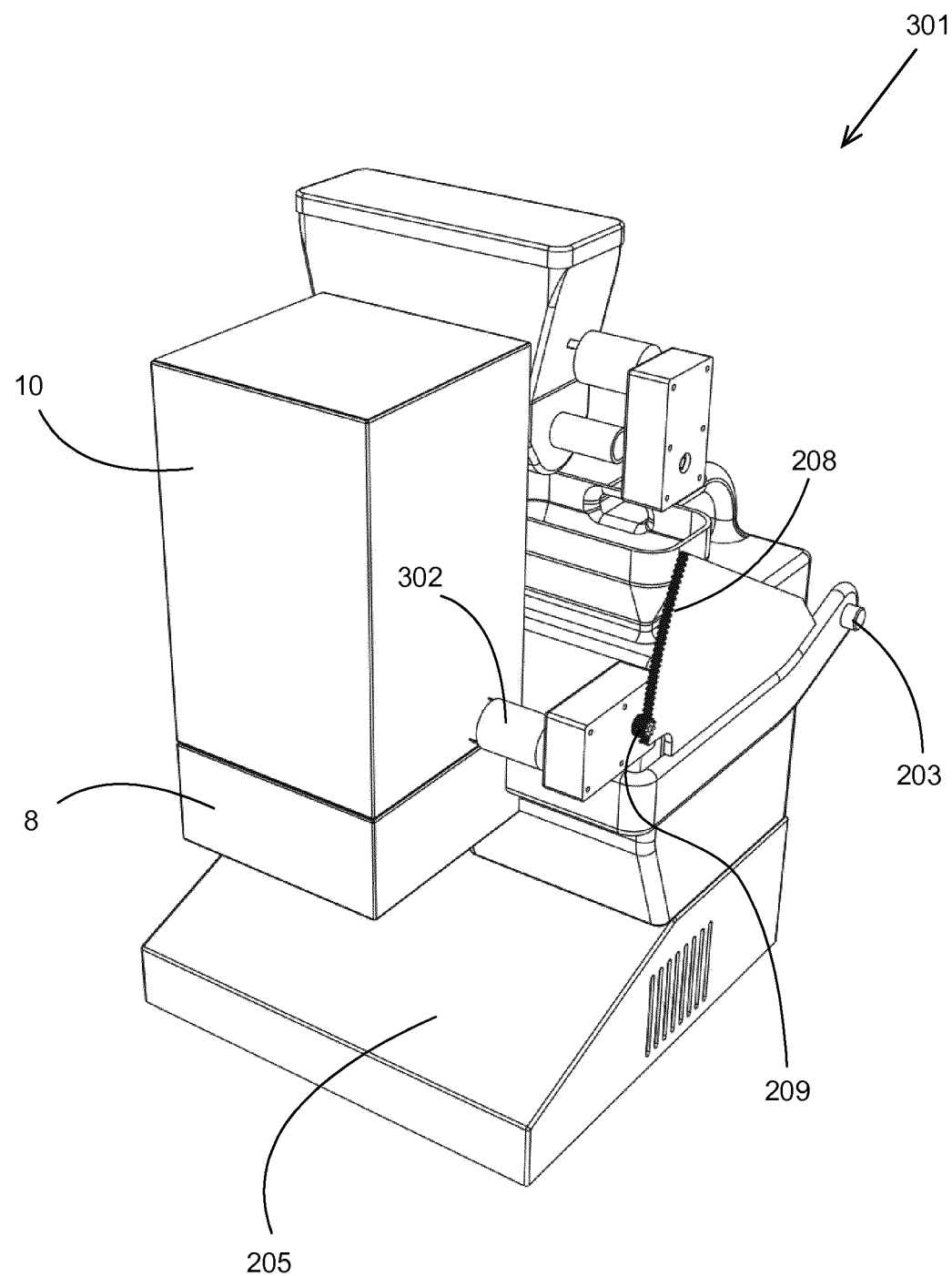
FIG. 13 shows a perspective front view and rear view of the apparatus as shown in FIGS. 12a and 12b in a closed position of the housing parts.

FIGS. 12a-13 disclose a fourth embodiment of an apparatus 301 according to the invention which differs from the apparatus 201 in that the gear wheel 209 is now electrically driven by a motor 302 which motor has a fixed position in the apparatus 301. By operating the electric motor 302, the gear wheel 209 is being driven. Since the gearwheel 209 cooperates with the teeth 208 on the disc 207, the disc 207 as well as the L-shaped bracket 202 and the first housing part 8 will be moved in a direction as indicated by arrow P3 to move the first housing part 8 from the open position as shown in FIG. 12a-12b to the closed position as shown in FIG. 13. By rotating the gearwheel 209 in the opposite direction the first housing part 8 will be moved in a direction opposite to arrow P3 from the closed position to the open position.

Figure 14:
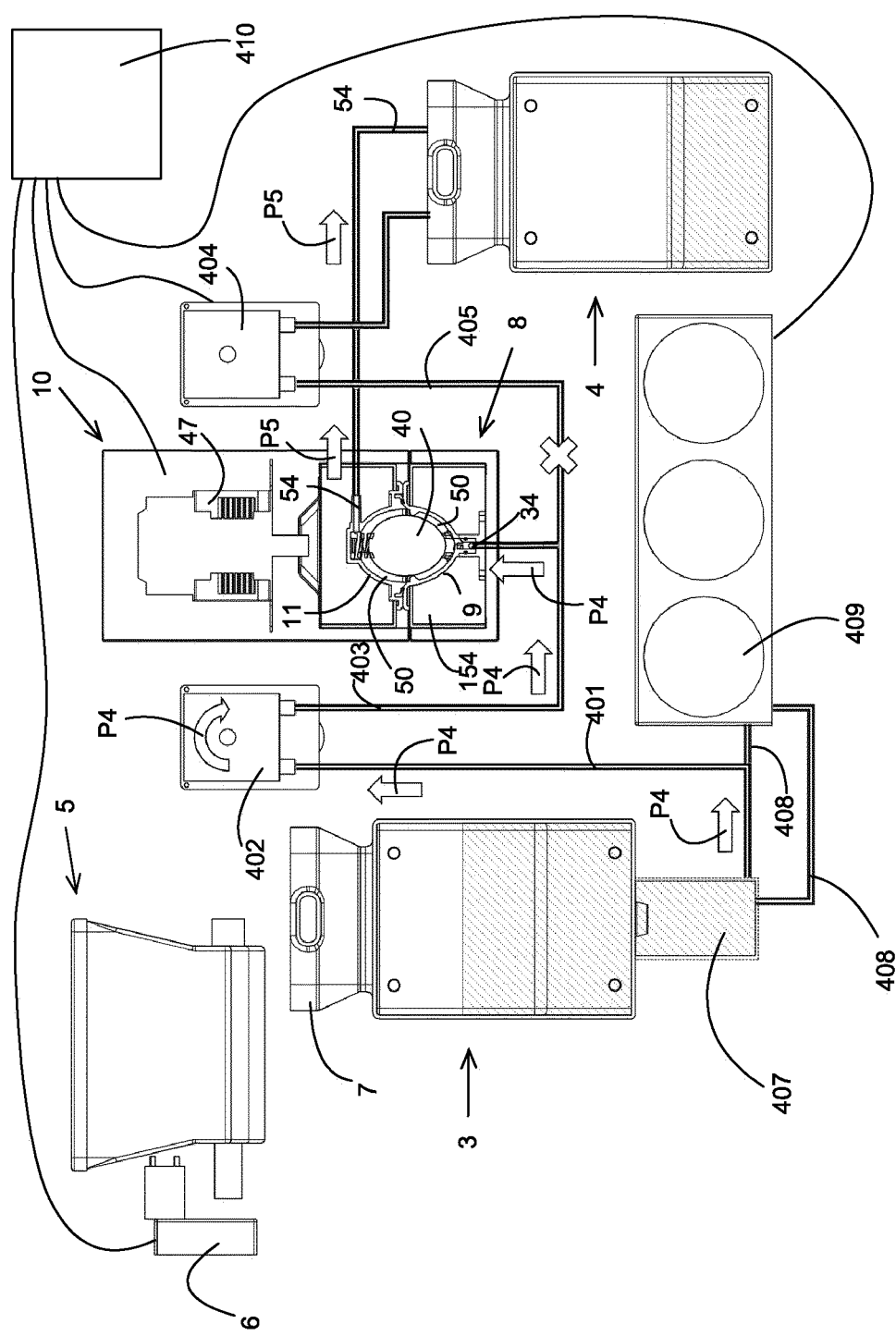
FIG. 14 shows a working scheme of the apparatus as shown in the FIGS. 6a-6b, 9, 11, 13 during the filling of the cavity and the cooking of the egg.
Figure 16:
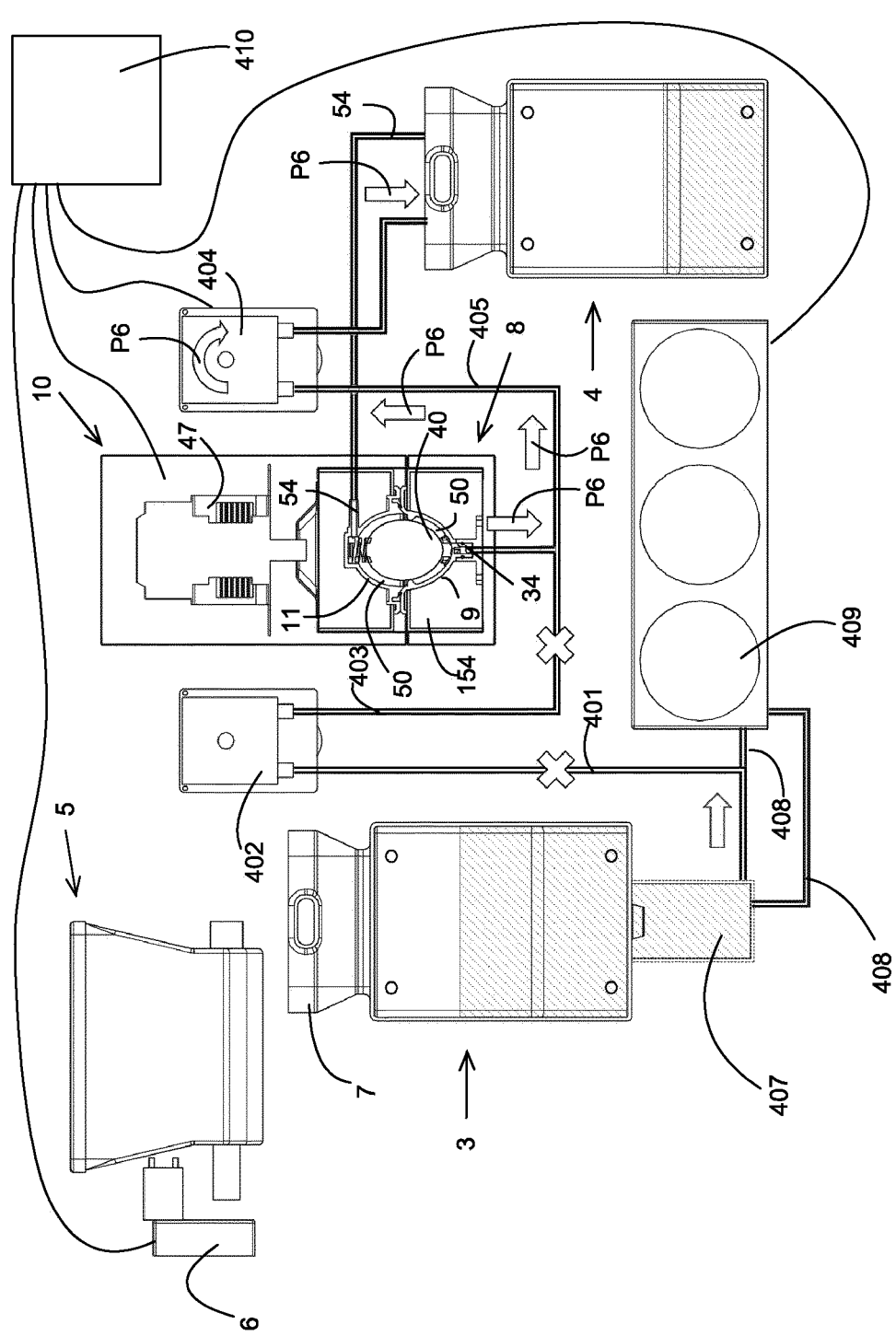
FIG. 16 shows a working scheme of the apparatuses as shown in the FIGS. 6a-6b, 9, 11, 13 during empting of the cavity after cooking of the egg.

FIGS. 14 and 16 show a more schematic view of the apparatus 1, 101, 201, 301.

As can be seen the first container 3 is connected via a conduit 401 to a first peristaltic pump 402. An outlet of the peristaltic pump 402 is connected via a conduit 403 to the end 34 of the spirally conduit 32 in the first housing part 8. The apparatus 1, 101, 201, 301 is further provided with a second peristaltic pump 404, which is connected by means of a conduit 405 to the end 34 of the spirally conduit 32 and is connected on another side of the pump 404 by means of a conduit 406 to the container 4. The conduit 54, which is connected to the cavity 50 in the second holder part 11 opens at an end remote of the cavity 50 into the container 4. Both the containers 3, 4 are open at the top so that in the containers 3, 4 the atmospheric pressure exists.

The first container 3 is provided at its lower part with a buffer unit 407. The buffer unit 407 is connected by means of a conduit 408 to a heat exchanger, for example a Peltier heat exchanger 409 to preheat the liquid before it enters first housing part 8. In the buffer 407 a temperature sensor may be present to check whether the liquid has the desired temperature.

The peristaltic pumps 402, 404, the device 47 for providing microwave radiation in the space 154, the Peltier heat exchanger, the dose unit 6 as well as sensors to check for example the liquid level in the containers 3, 4 are all controlled by means of a computer 410.

FIG. 14 discloses a scheme of the filling of the cavity 50 as well as the process during the cooking process of the egg 40.

The operations of the apparatus 1, 101, 201, 301 are as follows.

After placing an egg 40 in the cavity 50 and closing the first housing part 8 and the second housing part 10 the liquid in the buffer unit 407 will be heated to a predetermined temperature of for example 20 degrees Celsius.

After the liquid has reached the desired temperature the liquid will be pumped by means of the first pump 402 through the conduit 401 and the conduit 403 in the direction as shown by the arrow P4 into the spirally conduit 32 and into the cavity 50. The egg 40 will be nearly completely surrounded by the liquid except for the locations where the egg is in contact with the spacers 35 and the spring 51. It is also possible that a small part of the egg 40 near the spring 51 is not completely covered with the liquid. The liquid can be water with an addition of NaCl, for example preferably 0.2 M NaCl (about 12 gram/liter water), to obtain a liquid with a dielectric constant with an imaginary part, $\varepsilon''$, between 20-500 at a temperature between 0° C.-100° C. and at a microwave frequency of 2.45 GHz.

With an egg of about 60-65 grams and a length of about 56-60 millimeters an amount of about 45 milliliter of liquid will be sufficient to fill the space between the eggshell of the egg 40 and the walls 36, 49 of the first holder part 9 and the second holder part 11, whereby a layer of liquid around the eggshell is obtained having an average thickness of 2-8 millimeters.

After the cavity 50 is initially filled with the desired amount the device 47 operating at a common 2.45 GHz is switched on at a constant power of for example 1000 Watt, whereby microwave radiation is generated in the space 154 to heat the liquid as well as the egg 40 in the cavity 50. As soon the liquid starts to boil, the generated steam can escape through the conduit 54 and will flow in the direction indicated by arrow P5 into the container 4. To prevent that due to the evaporation of the liquid the egg 40 will no longer be surrounded with liquid, additional liquid is added to the cavity 50. This liquid enters the first housing part 8 at a temperature of about 20 degrees in small pulses by activating the first pump 402 during a predetermined time. Since the conduit 32 is located inside the cavity 54, also the liquid present in the conduit 32 will be heated by the microwave radiation. The conduit 32 might have a length of for example 40-80 centimeters being long enough to heat up the liquid in the conduit 32 at the end 34 from 20° C. so that the liquid when entering the cavity 50 will have about the same temperature as the liquid already present in the cavity 50. Other lengths are also possible.

Figure 15:
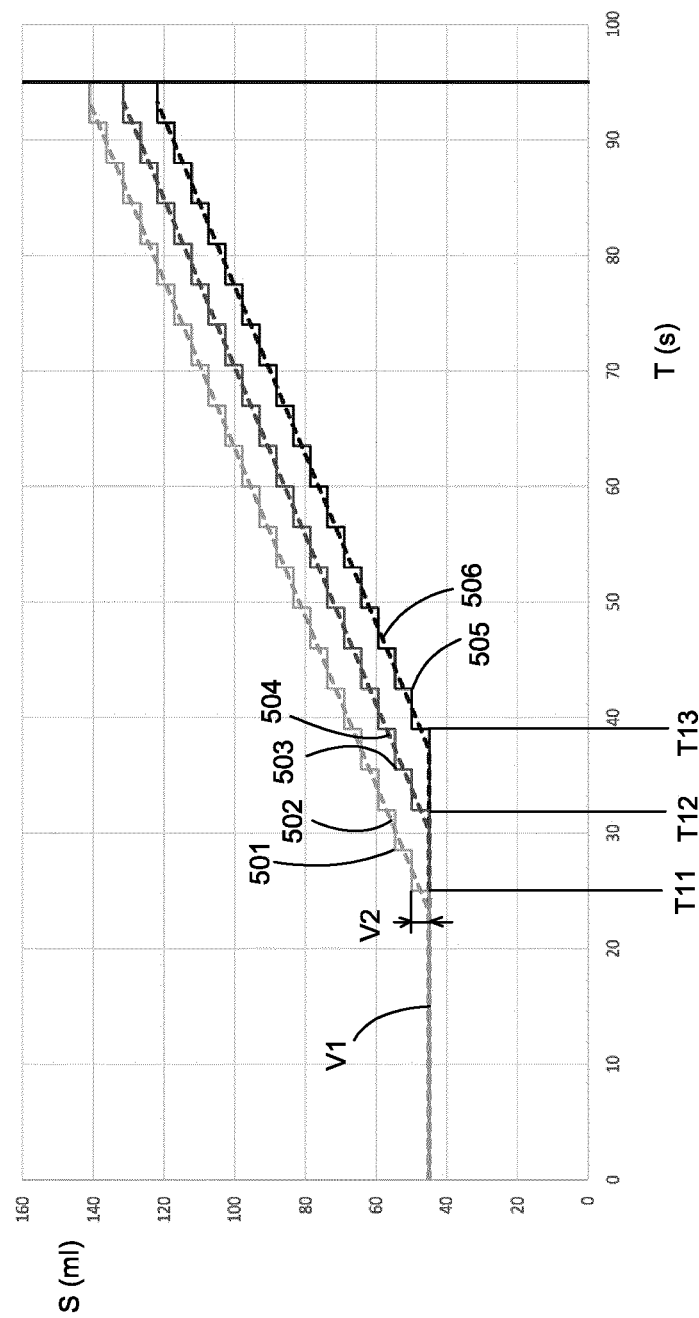
FIG. 15 shows a diagram disclosing the microwave radiation time versus the amount of liquid added to the cavity.

As can be seen in FIG. 15 a first amount V1 of liquid is added before the microwave radiation starts. After a period of time T11 of for example 25 seconds a small amount V2 of for example 5 milliliters is added to the cavity 50 which amount V2 is then added every 3.5 seconds. In the diagram, the pulses are shown by a line 501. In the diagram also the average amount of liquid added to the cavity 50 is indicated by means of a line 502. During the cooking process by means of the microwave radiation, the power of the device 47 is kept constant at 100 Watt. By operating the device at a constant power no irregular change in the microwave radiation will occur. After 95 seconds the microwave radiation will be stopped as can be seen in the diagram. As shown in FIG. 15 almost 100 milliliters have been added to the cavity 50 after the initial first amount of 45 milliliters. By adding such a relatively large second amount of liquid starting after such a relatively short time T11, a soft-boiled egg will be obtained.

By starting the insertion of additional liquid in the cavity 50 after a longer period of time T12, for example after 32 seconds of the start of the microwave radiation and by adding the same amount V2 in the same intervals of 3.5 seconds a middle-boiled egg will be obtained. The lines 503, 504 show respectively the pulses and the average amount of added liquid. The total second amount of liquid added to the cavity 50 for a middle-boiled egg is less than for a soft-boiled egg.

If the insertion of additional liquid starts even later, for example after a longer period of time T13, for example after 39 seconds with the same amount V2 and the same interval, a hard-boiled egg will be obtained. The lines 505, 506 show respectively the pulses and the average amount of added liquid. The total second amount of liquid added to the cavity 50 for a hard-boiled egg is less than for a soft-boiled egg and a middle-boiled egg.

After the microwave radiation has been switched off, the second pump 404 is switched on to pump 405 the liquid in the cavity 50 in a direction as indicated by arrow P6 through the conduit 32 into the conduit 404, through the pump 405 into the conduit 406 into the container 4 for waste liquid. The conduit 32 as well as the tubes 33, 37 are used both as inlet for the liquid into the cavity 50 as well as an outlet of the liquid from the cavity 50.

It is also possible to use microwave radiation whereby the power thereof is changed, for example lowered during the cooking process. In such a case the amount of liquid added during the microwave radiation will be different from the amount as shown in FIG. 15. It is also possible that instead of adding the liquid in pulses with an amount of V2 to add the liquid in smaller or larger amounts with a interval being larger or smaller than described above.

It is also possible to add the liquid at a constant rate or to vary the amount of added liquid in time. Also, smaller step sizes can be chosen, such that the flow is accurately controlled by means of pulse width modulation, resulting in the same egg preparation program with the same amounts of pumped liquids.

It is also possible to have different holders for different sizes of eggs. It is also possible to have other amounts of NaCl in the water, for example between 10 and 14 gram/liter water.

It is also possible to preheat the liquid to another temperature, for example about 30-35 degrees Celsius before entering the housing.

It is also possible to start the addition of the second amount of liquid based on for example the temperature in the cavity or the amount of liquid that has been evaporated and has left the cavity.

The person skilled in the art will realize that the present invention is by no means limited to the preferred embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the scope should not be construed as limiting the scope of the claims.

LIST OF REFERENCE SIGNS 1 apparatus
2 base 3 container
4 container
5 container
6 dosing unit
7 opening
8 first housing part
9 first holder part
10 second housing part
11 second holder part
12 gearing mechanism
13 rod
14 teeth
16 gear wheel
17 pivot axis
18 gear wheel
19 teeth
20 disc
21 pivot axis
22 handle
23 leg
24 bridge shaped part
30 bottom wall
31 side wall
32 conduit
33 tube
34 end
35 spacer
36 wall
37 tube
38 sealing ring
39 opening
40 egg
41 conical part
45 top wall
46 side wall
47 device
48 chamber
49 wall
50 cavity
51 spring
52 conical part
53 seal
54 conduit
101 apparatus
154 space
201 apparatus
202 bracket
203 pivot axis
204 handle
205 surface
206 damping mechanism
207 disc
208 teeth
209 gear wheel
301 apparatus
302 motor
401 conduit
402 peristaltic pump
403 conduit
404 peristaltic pump
405 conduit
406 conduit
407 buffer
409 heat exchanger
410 computer
501 line
502 line
503 line
504 line
505 line
506 line
P3 arrow
P4 arrow
P6 arrow
V1 amount of liquid
V2 amount of liquid
T11 period of time
T12 period of time
T13 period of time

The invention claimed is:

1. An apparatus for cooking at least one egg with an eggshell, which apparatus comprises a housing provided with a device for providing microwave radiation in a confined space in the housing and a holder located in the confined space, which holder being provided with at least one cavity adapted to the shape of the egg with the eggshell, which apparatus further comprises a pump system which includes means to insert a liquid into the holder for filling the cavity with the liquid to at least partly surround the eggshell of the egg located in the cavity, wherein that the apparatus comprises means to control the amount of liquid in the holder during a cooking process of the at least one egg wherein:

the holder comprises a first holder part and a second holder part, whereby the first holder part comprises an inlet for the liquid into the cavity as well as an outlet of the liquid from the cavity, whilst the second holder part comprises an outlet for at least a gaseous phase of the liquid formed in the cavity during the cooking process, a first amount of liquid is inserted into the cavity through the inlet in the first holder part before providing microwave radiation in the cavity, which first amount of liquid at least partly surrounds the eggshell of the egg located in the cavity;

a second amount of liquid is inserted into the cavity through the inlet in the first holder part during providing microwave radiation to replenish the amount of liquid that has been evaporated and has left the cavity through the outlet in the second holder part during providing microwave radiation in the cavity and which maintains a desired layer of liquid around the egg located in the cavity.

2. An apparatus according to claim 1, wherein the apparatus comprises means to insert the second amount of liquid into the cavity after a first predetermined period of time of providing microwave radiation and during a second predetermined period of time of providing microwave radiation.

3. An apparatus according to claim 2, wherein the second amount of liquid is added in pulses during the second predetermined period of time of providing microwave radiation.

4. An apparatus according to claim 2, wherein the sum of the first predetermined period of time of providing microwave radiation and the second predetermined period of time of providing microwave radiation is about the same for the cooking process of a soft-boiled egg and a hard-boiled egg.

5. An apparatus according to claim 1, wherein the second amount of liquid is larger for the cooking process of a soft-boiled egg than for a hard-boiled egg.

6. An apparatus according to claim 1, wherein the first amount of liquid is between 30 and 60 milliliter, whilst the second amount of liquid is between 60 and 120 milliliter.

7. An apparatus according to claim 1, wherein the liquid is an aqueous liquid with a dielectric constant with an imaginary part, ε", between 20-500 at a temperature between 0° C.-100° C. at a microwave frequency of 2.45 GHz.

8. An apparatus according to claim 7, wherein the aqueous liquid is water with NaCl.

9. An apparatus according to claim 7, wherein the aqueous liquid is water with 0.2 M NaCl.

10. An apparatus according to claim 1, wherein the apparatus comprises a conduit guiding liquid into the cavity, which conduit is at least partly located in the confined space, wherein the second amount of liquid is preheated in the conduit by the microwave radiation before the liquid is inserted into the holder.

11. An apparatus according to claim 10, wherein the part of the conduit located in the confined space is between 40 and 80 centimeters long.

12. An apparatus according to claim 1, wherein the liquid has an average layer thickness between the holder and the eggshell of the egg between 2 and 8 millimeters.

13. An apparatus according to claim 1, wherein the pump system comprises at least two pumps, wherein a first pump is connected by a first conduit to the liquid inlet of the first holder part to insert liquid into the holder, whilst a second pump is connected by a second conduit to the liquid outlet of the first holder part.

14. A method for cooking at least one egg with an eggshell in an apparatus comprising a housing provided with a device for providing microwave radiation in a confined space in the housing and a holder located in the confined space, which holder being provided with at least one cavity adapted to the shape of the egg with the eggshell, which apparatus further comprises means to insert a liquid into the holder for filling the at least one cavity with the liquid to at least partly surround the eggshell of the egg located in the at least one cavity, wherein in that the apparatus comprises means to control the amount of liquid in the holder during a cooking process of the at least one egg during which liquid evaporates and leaves the at least one cavity, wherein:

a first amount of liquid is inserted into the at least one cavity before providing microwave radiation into the at least one cavity, which first amount of liquid at least partly surrounds the eggshell of the egg located in the at least one cavity;

a second amount of liquid is inserted into the at least one cavity during providing microwave radiation to replenish the amount of liquid that has been evaporated and has left the at least one cavity during providing microwave radiation in the at least one cavity and to maintain a desired layer of liquid around the egg located in the at least one cavity.

15. A method according to claim 14, wherein the second amount of liquid is inserted into the at least one cavity after a first predetermined period of time of providing microwave radiation and during a second predetermined period of time of providing microwave radiation.

16. A method according to claim 14, wherein the second amount of liquid is larger for the cooking process of a soft-boiled egg than for a hard-boiled egg.

\* \* \* \* \*